United States Patent
Bodin et al.

(10) Patent No.: US 8,161,112 B2
(45) Date of Patent: Apr. 17, 2012

(54) DYNAMIC MEDIA CONTENT FOR COLLABORATORS WITH CLIENT ENVIRONMENT INFORMATION IN DYNAMIC CLIENT CONTEXTS

(75) Inventors: William K. Bodin, Austin, TX (US); Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 12/058,673

(22) Filed: Mar. 29, 2008

(65) Prior Publication Data
US 2008/0177838 A1    Jul. 24, 2008

Related U.S. Application Data

(63) Continuation of application No. 10/832,035, filed on Apr. 26, 2004, now Pat. No. 7,827,239.

(51) Int. Cl.
*G06F 15/16* (2006.01)
(52) U.S. Cl. .................................. 709/205; 709/224
(58) Field of Classification Search .................. None
See application file for complete search history.

(56) References Cited

U.S. PATENT DOCUMENTS

| | | | |
|---|---|---|---|
| 3,644,674 A | 2/1972 | Mitchell et al. | |
| 4,941,187 A | 7/1990 | Slater | |
| 5,119,465 A | 6/1992 | Jack et al. | |
| 5,181,162 A | 1/1993 | Smith et al. | |
| 5,327,176 A | 7/1994 | Forler et al. | |
| 5,388,185 A | 2/1995 | Terry et al. | |
| 5,428,400 A | 6/1995 | Landis et al. | |
| 5,649,223 A | 7/1997 | Freeman | |
| 5,724,416 A | 3/1998 | Foladare et al. | |
| 5,745,682 A | 4/1998 | Keenan | |
| 5,748,186 A | 5/1998 | Raman | |
| 5,748,725 A | 5/1998 | Kubo | |
| 5,774,879 A | 6/1998 | Custy et al. | |
| 5,787,175 A | 7/1998 | Carter | |
| 5,881,373 A | 3/1999 | Elofsson et al. | |
| 5,901,230 A | 5/1999 | Walker | |
| 5,915,001 A * | 6/1999 | Uppaluru | 379/88.22 |

(Continued)

FOREIGN PATENT DOCUMENTS
WO    WO 0111586 A1 *  2/2001
(Continued)

OTHER PUBLICATIONS

Engelbart; Authorship Provision in Augment; IEEE Cat. No. 84CH2017-2;, Spring 1984; p. 465-472; IEEE Comput. Soc. Press, Silver Spring, MD; USA.

(Continued)

*Primary Examiner* — Patrice Winder
(74) *Attorney, Agent, or Firm* — Brevetto Law Group

(57) ABSTRACT

Delivering dynamic media content to collaborators, including providing collaborative event media content, where the collaborative event media content further comprises a grammar and a structured document; acquiring data representing a client's environmental condition; storing, in the context server in a data structure comprising a dynamic client context for the client, the data representing a client's environmental condition; detecting an event in dependence upon the dynamic client context; identifying one or more collaborators in dependence upon the dynamic client context and the event; selecting from the structured document a classified structural element in dependence upon an event type and a collaborator classification; and transmitting the selected structural element to the collaborator.

32 Claims, 15 Drawing Sheets

U.S. PATENT DOCUMENTS

| | | | |
|---|---|---|---|
| 5,917,480 A | 6/1999 | Tafoya et al. |
| 5,983,227 A | 11/1999 | Nazem et al. |
| 6,026,069 A | 2/2000 | Holtslag |
| 6,029,043 A | 2/2000 | Ho et al. |
| 6,049,332 A | 4/2000 | Boetje et al. |
| 6,052,730 A | 4/2000 | Felciano et al. |
| 6,058,416 A | 5/2000 | Mukherjee et al. |
| 6,092,155 A | 7/2000 | Olnowich |
| 6,119,147 A | 9/2000 | Toomey et al. |
| 6,138,040 A | 10/2000 | Nicholls et al. |
| 6,161,112 A | 12/2000 | Cragun et al. |
| 6,163,768 A | 12/2000 | Sherwood et al. |
| 6,172,640 B1 | 1/2001 | Durst et al. |
| 6,212,275 B1 | 4/2001 | Akhteruzzaman |
| 6,243,454 B1 | 6/2001 | Eslambolchi |
| 6,249,281 B1 | 6/2001 | Chen et al. |
| 6,266,691 B1 | 7/2001 | Watanabe et al. |
| 6,269,336 B1 | 7/2001 | Ladd et al. |
| 6,269,398 B1 | 7/2001 | Leong et al. |
| 6,304,283 B1 | 10/2001 | Kitagawa |
| 6,314,402 B1 | 11/2001 | Monaco et al. |
| 6,324,499 B1 | 11/2001 | Lewis et al. |
| 6,341,402 B2 | 1/2002 | Lindquist |
| 6,343,290 B1 | 1/2002 | Cossins |
| 6,349,136 B1 | 2/2002 | Light et al. |
| 6,366,578 B1 | 4/2002 | Johnson |
| 6,393,460 B1 | 5/2002 | Gruen et al. |
| 6,446,096 B1 | 9/2002 | Holland et al. |
| 6,448,980 B1 | 9/2002 | Kumar et al. |
| 6,452,915 B1 | 9/2002 | Jorgensen |
| 6,470,384 B1 | 10/2002 | O'Brien et al. |
| 6,493,671 B1 | 12/2002 | Ladd et al. |
| 6,505,195 B1 | 1/2003 | Ikeda et al. |
| 6,587,822 B2 | 7/2003 | Brown |
| 6,636,238 B1 | 10/2003 | Amir et al. |
| 6,644,674 B2 | 11/2003 | Simard |
| 6,647,531 B2 | 11/2003 | Isaac et al. |
| 6,658,414 B2 | 12/2003 | Bryan et al. |
| 6,665,715 B1 | 12/2003 | Houri |
| 6,677,858 B1 | 1/2004 | Faris et al. |
| 6,681,247 B1 | 1/2004 | Payton |
| 6,717,593 B1 | 4/2004 | Jennings |
| 6,725,199 B2 | 4/2004 | Brittan et al. |
| 6,725,256 B1 | 4/2004 | Albal et al. |
| 6,763,226 B1 | 7/2004 | McZeal, Jr. |
| 6,766,368 B1 | 7/2004 | Jakobson et al. |
| 6,778,989 B2 | 8/2004 | Bates |
| 6,799,208 B1 | 9/2004 | Sankaranarayan et al. |
| 6,819,338 B2 | 11/2004 | Heasman et al. |
| 6,829,745 B2 | 12/2004 | Yassin et al. |
| 6,879,958 B1 | 4/2005 | Kojima et al. |
| 6,892,348 B1 | 5/2005 | Truelove et al. |
| 6,931,254 B1 | 8/2005 | Egner et al. |
| 6,981,263 B1 | 12/2005 | Zhang et al. |
| 7,000,183 B1 | 2/2006 | Crawford, Jr. |
| 7,003,550 B1 | 2/2006 | Cleasby et al. |
| 7,058,890 B2 | 6/2006 | George et al. |
| 7,079,712 B1 | 7/2006 | Silverbrook et al. |
| 7,099,920 B1 | 8/2006 | Kojima et al. |
| 7,149,694 B1 | 12/2006 | Harb et al. |
| 7,162,692 B2 | 1/2007 | Bodin et al. |
| 7,174,557 B2 | 2/2007 | Sanghvi et al. |
| 7,249,157 B2 | 7/2007 | Stewart et al. |
| 7,283,621 B2 | 10/2007 | Quinton |
| 7,287,093 B2 | 10/2007 | Lynch et al. |
| 7,287,221 B2 | 10/2007 | Bodin et al. |
| 7,299,405 B1 | 11/2007 | Lee et al. |
| 7,308,484 B1 | 12/2007 | Dodrill |
| 7,313,595 B2 | 12/2007 | Rust |
| 7,334,050 B2 | 2/2008 | Zondervan et al. |
| 7,395,505 B1 | 7/2008 | Khosla et al. |
| 7,426,538 B2 | 9/2008 | Bodin et al. |
| 7,428,698 B2 | 9/2008 | Bodin et al. |
| 7,430,707 B2 | 9/2008 | Bodin et al. |
| 7,469,380 B2 | 12/2008 | Wessling et al. |
| 7,487,208 B2 | 2/2009 | Bodin et al. |
| 7,487,209 B2 | 2/2009 | Bodin et al. |
| 7,487,451 B2 | 2/2009 | Bodin et al. |
| 7,519,659 B2 | 4/2009 | Bodin et al. |
| 7,519,683 B2 | 4/2009 | Bodin et al. |
| 7,519,904 B2 | 4/2009 | Bodin et al. |
| 7,567,908 B2 | 7/2009 | Bodin et al. |
| 7,571,380 B2 | 8/2009 | Bodin et al. |
| 7,603,112 B2 * | 10/2009 | Huomo et al. ............ 455/414.2 |
| 7,634,412 B2 | 12/2009 | Bodin et al. |
| 7,802,182 B2 | 9/2010 | Bales |
| 2001/0032218 A1 | 10/2001 | Huang |
| 2001/0032241 A1 | 10/2001 | Illa |
| 2001/0041973 A1 | 11/2001 | Abkowitz et al. |
| 2001/0054048 A1 | 12/2001 | Kelsey |
| 2002/0010715 A1 | 1/2002 | Chinn |
| 2002/0032564 A1 | 3/2002 | Ehsani et al. |
| 2002/0035976 A1 | 3/2002 | Nakamura et al. |
| 2002/0046212 A1 | 4/2002 | Meifu |
| 2002/0075303 A1 | 6/2002 | Thompson et al. |
| 2002/0087416 A1 | 7/2002 | Knutson |
| 2002/0087974 A1 | 7/2002 | Sprague |
| 2002/0095454 A1 | 7/2002 | Reed et al. |
| 2002/0119434 A1 | 8/2002 | Beams et al. |
| 2002/0129354 A1 | 9/2002 | Bryan et al. |
| 2002/0133500 A1 | 9/2002 | Arlein et al. |
| 2002/0138331 A1 | 9/2002 | Hosea et al. |
| 2002/0147782 A1 | 10/2002 | Dimitrova et al. |
| 2002/0152301 A1 | 10/2002 | Garrett et al. |
| 2002/0188451 A1 | 12/2002 | Guerra et al. |
| 2003/0023435 A1 | 1/2003 | Josephson |
| 2003/0028871 A1 | 2/2003 | Wang et al. |
| 2003/0037301 A1 | 2/2003 | Rising, III |
| 2003/0041238 A1 | 2/2003 | French et al. |
| 2003/0056172 A1 * | 3/2003 | Vukelic et al. ................ 715/512 |
| 2003/0060212 A1 | 3/2003 | Thomas |
| 2003/0060214 A1 | 3/2003 | Hendrey |
| 2003/0065712 A1 | 4/2003 | Cheung et al. |
| 2003/0071833 A1 | 4/2003 | Dantzig et al. |
| 2003/0074606 A1 | 4/2003 | Boker |
| 2003/0085912 A1 | 5/2003 | Soo et al. |
| 2003/0099343 A1 | 5/2003 | Dezonno |
| 2003/0158969 A1 | 8/2003 | Gimson et al. |
| 2003/0177205 A1 | 9/2003 | Liang et al. |
| 2003/0187656 A1 | 10/2003 | Goose |
| 2003/0208473 A1 | 11/2003 | Lennon |
| 2003/0229900 A1 | 12/2003 | Reisman |
| 2004/0003042 A1 | 1/2004 | Horvitz et al. |
| 2004/0006595 A1 | 1/2004 | Yeh et al. |
| 2004/0088654 A1 | 5/2004 | Uotani |
| 2004/0105127 A1 | 6/2004 | Cudd et al. |
| 2004/0107404 A1 | 6/2004 | Burns et al. |
| 2004/0141016 A1 | 7/2004 | Fukatsu et al. |
| 2004/0193425 A1 | 9/2004 | Tomes |
| 2004/0204979 A1 | 10/2004 | Eisenberg et al. |
| 2004/0205081 A1 | 10/2004 | Chao |
| 2004/0205114 A1 | 10/2004 | Kinoshita |
| 2004/0205132 A1 | 10/2004 | Czerwonka |
| 2004/0205452 A1 | 10/2004 | Fitzsimons et al. |
| 2004/0205572 A1 | 10/2004 | Fields et al. |
| 2004/0205629 A1 | 10/2004 | Rosenholtz et al. |
| 2005/0025136 A1 | 2/2005 | Anschutz et al. |
| 2005/0131944 A1 | 6/2005 | Patrick et al. |
| 2005/0132271 A1 | 6/2005 | Bodin et al. |
| 2005/0132273 A1 | 6/2005 | Bodin et al. |
| 2005/0132274 A1 | 6/2005 | Bodin et al. |
| 2005/0132275 A1 | 6/2005 | Bodin et al. |
| 2005/0154970 A1 | 7/2005 | Bodin et al. |
| 2005/0154975 A1 | 7/2005 | Bodin et al. |
| 2005/0165900 A1 | 7/2005 | Bodin et al. |
| 2005/0171780 A1 | 8/2005 | Schmid et al. |
| 2005/0240603 A1 | 10/2005 | Bodin et al. |
| 2005/0240608 A1 | 10/2005 | Jones et al. |
| 2005/0240859 A1 | 10/2005 | Bodin et al. |
| 2005/0240909 A1 | 10/2005 | Tersigni |
| 2006/0010365 A1 | 1/2006 | Bodin et al. |
| 2006/0010370 A1 | 1/2006 | Bodin et al. |
| 2006/0014546 A1 | 1/2006 | Bodin et al. |
| 2006/0015557 A1 | 1/2006 | Bodin et al. |
| 2006/0080614 A1 | 4/2006 | Lentz |
| 2006/0136809 A1 | 6/2006 | Fernstrom |
| 2006/0218245 A1 | 9/2006 | Horn |

| | | |
|---|---|---|
| 2006/0277465 A1 | 12/2006 | Pandit et al. |
| 2007/0250602 A1 | 10/2007 | Bodin et al. |
| 2007/0266097 A1 | 11/2007 | Harik et al. |
| 2008/0141117 A1 | 6/2008 | King et al. |
| 2008/0172227 A1 | 7/2008 | Bodin et al. |
| 2008/0177837 A1 | 7/2008 | Bodin et al. |
| 2008/0177838 A1 | 7/2008 | Bodin et al. |
| 2008/0177866 A1 | 7/2008 | Bodin et al. |
| 2008/0178078 A1 | 7/2008 | Bodin et al. |
| 2008/0235028 A1 | 9/2008 | Bodin et al. |
| 2008/0259910 A1 | 10/2008 | Bodin et al. |
| 2008/0263435 A1 | 10/2008 | Bodin et al. |
| 2008/0282168 A1 | 11/2008 | Bodin et al. |
| 2009/0037820 A1 | 2/2009 | Bodin et al. |
| 2009/0048829 A1 | 2/2009 | Bodin et al. |
| 2009/0099842 A1 | 4/2009 | Bodin et al. |

FOREIGN PATENT DOCUMENTS

| | | |
|---|---|---|
| WO | WO 01/20481 A2 | 3/2001 |
| WO | WO 01/24462 A1 | 4/2001 |

OTHER PUBLICATIONS

Websgebg et al; Real-time Content-Based Processing of Multicast Video; Cat. No. 98CH36284; 1998; pp. 882-886, vol. 1; IEEE, Piscataway, NJ, USA; USA.

Kim et al; An Extended Object Composition Model for Distributed Multimedia Services; Cat. No. 98CH36284; Jan. 2002; pp. 279-286, vol. 1; IEEE, Piscataway, NJ, USA; USA.

Agawa et al.; Image Analysis for Face Modeling and Facial Image Reconstruction; SPIE; 1990; pp. 1184-1197; vol. 1360, pt 2; US.

Kim et al.; An Extended Object Composition Model for Distributed Multimedia Supports in World-Wide Web; INSPEC AN B9810-6210R-071, C9810-6130M-080; 1997; pp. 159-174; Singapore.

U.S. Appl. No. 10/285,615, filed Oct. 2002, Bates.

U.S. Appl. No. 12/331,524, filed Dec. 2008, Bodin et al.

W3C, "XHTML+Voice Profile 1.0," Dec. 21, 2001, pp. 1-20.

W3C, "Speech Synthesis Markup Language Version 1," Dec. 2, 2002, downloaded pp. 1-36.

IBM, "IBM WebShere Voice Server 2.0 Implementation Guide," IBM Redbook, May 2002, title page, copyright page, and pp. 251-276 and 291-292.

Christian, et al. "A Comparison of Voice controlled and Mouse Controlled Web Browsing," Assets 2000, 72-79, Arlington, VA, 2000, downloaded from: http://citeseer.its.psu.edu/373105.html, downloaded pages including CiteSeer bibliography, 1-10.

Karl, et al., "Speech-Activated versus Mouse-Activated Commands for Word Processing Applications: An Empirical Evaluation," Int'l J. Man-Machine Studies, vol. 39, pp. 667-687, 1993, downloaded from http://hcil.cs.umd.edu/trs/92-09/92-09.html, downloaded pp. 1-17.

Damiani, et al. "A Fine-Grained Access Control System for XML Documents," ACM Transactions on Information and System Security, vol. 5, No. 2, May 2002, pp. 169-202.

Kudo, et al., "XML Document Security based on Provisional Authorization," CSS'00 Athens, Greece, copyright 2000, pp. 87-96.

Begel, et al., "SpeedNav: Document Navigation by Voice", University of California, Berkeley, Oct. 9, 2002.

Goose, et al., "Streaming Speech: A Framework for Generating and Streaming 3-D Text-To-Speech and Audio Presentations to Wireless PDAs as Specified Using Extensions to SMIL", WWW2002, May 2002, p. 1-16, Honolulu, Hawaii; USA.

Freire, et al., "Webviews: Accessing Personalized Web Content and Services", Proceedings of the 10th International Conference on World Wide Web, May 2001, ACM Press, p. 576-586, Hong Kong.

Engelbart; Authorship Provision in Augment; IEEE Cat. No. 84CH2017-2; Spring 1984; p. 465-472; IEEE Comput. Soc. Press, Silver Spring, MD; USA.

Wensbeng, et al; Real-time Content Based Processing of Multicast Video; Cat. No. 98CH36284; 1998; pp. 882-886, vol. 1; IEEE, Piscataway, NJ; USA.

Kim et al; An Extended Object Composition Model for Distributed Multimedia Services; Cat. No. 98CH36284; Jan. 2002; pp. 279-286, vol. 1; IEEE, Piscataway, NJ; USA.

Agawa et al. "Image Analysis for Face Modeling and Facial Image Reconstruction" SPIE; 1990; pp. 1184-1197; vol. 1360, pt 2; USA.

Kim et al.; An Extended Object Composition Model for Distributed Multimedia Supports in World Wide Web; INSPEC AN B9810-6210R-071, C9810-6130M-080; 1997; pp. 159-174; Singapore.

Capra, et al., "WebContext: Remote Access to Shared Context", ACM International Conference Proceeding Series, vol. 15, Proceedings of the 2001 Workshop on Perceptive User Interfaces, 2001, p. 1-9.

Corcoran, et al., "Home Network Infrastructure for Handheld/Wearable Appliances", IEEE Transactions on Consumer Electronics, Aug. 2002, vol. 48, Issue 3, p. 490-495.

Komlodi et al., "Key Frame Preview Techniques for Video Browsing", ACM 2002, pp. 118-125.

Cruz, et al. "A Visual Approach to Multimedia Querying and Presentation" ACM 1997, pp. 109-119.

Shumate, "Hyperizons", Google 1997, pp. 1-3.

Chigona et al., "Contextualized Preview of Image Map Links", ACM 2002, pp. 150-158.

Rao et al., Evolution of Mobile Location-Based Services. Commun. ACM 46, 12 (Dec. 2003), pp. 61-65.

Sripanidkulchai, et al., "Efficient content location using interest-based locality in peer-to-peer systems." Infocom 2003. Twenty-Second Annual Joint Conference of the IEEE Computer and Communications Societies. IEEE, vol. 3, pp. 2166-2176, Mar. 30-Apr. 3, 2003.

Kimbrough et al., "Deontic Logic 2: On Original Generation of Structure in Legal Documents", Proceedings of the 9th International Conference Artificial Intelligence and Law, Jun. 2003, pp. 152-161.

Adelberg, Brad, "NoDoSE—A Tool for Semi-Automatically Extracting Structured and Semistructure Data from Text Documents", ACM Sigmod Record, vol. 27, Issue 2, Jun. 1998, pp. 283-294.

Notice of Allowance Dated Sep. 29, 2008 0in U.S. Appl. No. 10/733,954.

Office Action Dated Jan. 12, 2006 in U.S. Appl. No. 10/734,764.

Office Action Dated Jun. 27, 2006 in U.S. Appl. No. 10/734,764.

Final Office Action Dated Apr. 18, 2007 in U.S. Appl. No. 10/734,764.

Office Action Dated Jan. 12, 2006 in U.S. Appl. No. 10/733,947.

Office Action Dated Jun. 27, 2006 in U.S. Appl. No. 10/733,947.

Final Office Action Dated Dec. 14, 2006 in U.S. Appl. No. 10/733,947.

Office Action Dated May 4, 2007 in U.S. Appl. No. 10/733,941.

Final Office Action Dated Oct. 10, 2007 in U.S. Appl. No. 10/733,941.

Office Action Dated Jun. 12, 2008 in U.S. Appl. No. 10/733,941.

Final Office Action Dated Dec. 5, 2008 in U.S. Appl. No. 10/733,941.

Notice of Allowance Dated Aug. 6, 2009 in U.S. Appl. No. 10/733,941.

Office Action Dated Jan. 10, 2006 in U.S. Appl. No. 10/733,937.

Final Office Action Dated Jun. 1, 2006 in U.S. Appl. No. 10/733,937.

Office Action Dated Jan. 30, 2006 in U.S. Appl. No. 10/733,943.

Final Office Action Dated Jun. 28, 2006 in U.S. Appl. No. 10/733,943.

Office Action Dated Feb. 27, 2006 in U.S. Appl. No. 10/733,942.

Notice of Allowance Dated Jul. 19, 2006 in U.S. Appl. No. 10/733,942.

Office Action Dated Mar. 8, 2006 in U.S. Appl. No. 10/756,159.

Final Office Action Dated Aug. 31, 2006 in U.S. Appl. No. 10/756,159.

Notice of Allowance Dated Jun. 19, 2007 in U.S. Appl. No. 10/756,159.

Office Action Dated Sep. 30, 2008 in U.S. Appl. No. 10/756,126.

Notice of Allowance Dated Mar. 23, 2009 in U.S. Appl. No. 10/756,126.

Office Action Dated Aug. 3, 2006 in U.S. Appl. No. 10/756,107.

Office Action Dated Feb. 1, 2007 in U.S. Appl. No. 10/756,107.

Final Office Action Dated Sep. 6, 2007 in U.S. Appl. No. 10/756,107.

Office Action Dated Feb. 20, 2008 in U.S. Appl. No. 10/756,107.

Notice of Allowance Dated Jun. 27, 2008 in U.S. Appl. No. 10/756,107.

Final Office Action Dated Sep. 21, 2006 in U.S. Appl. No. 10/756,110.

Office Action Dated Mar. 10, 2006 in U.S. Appl. No. 10/756,110.
Office Action Dated Mar. 8, 2006 in U.S. Appl. No. 10/756,145.
Final Office Action Dated Jan. 18, 2007 in U.S. Appl. No. 10/756,145.
Office Action Dated Sep. 6, 2007 in U.S. Appl. No. 10/756,145.
Notice of Allowance Dated May 19, 2008 in U.S. Appl. No. 10/756,145.
Office Action Dated Mar. 8, 2006 in U.S. Appl. No. 10/756,146.
Final Office Action Dated Jan. 18, 2007 in U.S. Appl. No. 10/756,146.
Office Action Dated Mar. 22, 2006 in U.S. Appl. No. 10/756,158.
Final Office Action Dated Aug. 29, 2006 in U.S. Appl. No. 10/756,158.
Office Action Dated Mar. 31, 2008 in U.S. Appl. No. 10/887,516.
Notice of Allowance Dated Sep. 24, 2008 in U.S. Appl. No. 10/887,516.
Office Action Dated Dec. 19, 2006 in U.S. Appl. No. 10/887,517.
Final Office Action Apr. 23, 2007 in U.S. Appl. No. 10/887,517.
Notice of Allowance Dated May 19, 2008 in U.S. Appl. No. 10/887,517.
Office Action Dated Jul. 25, 2006 in U.S. Appl. No. 10/887,518.
Final Office Action Dated Apr. 11, 2007 in U.S. Appl. No. 10/887,518.
Office Action Dated Jun. 28, 2006 in U.S. Appl. No. 10/887,430.
Final Office Action Dated Dec. 5, 2006 in U.S. Appl. No. 10/887,430.
Office Action Dated Jul. 10, 2008 in U.S. Appl. No. 10/887,429.
Notice of Allowance Dated Dec. 11, 2008 in U.S. Appl. No. 10/887,429.
Office Action Dated Apr. 4, 2008 in U.S. Appl. No. 10/832,006.
Notice of Allowance Dated Dec. 2, 2008 in U.S. Appl. No. 10/832,006.
Office Action Dated Aug. 6, 2008 in U.S. Appl. No. 10/832,035.
Notice of Allowance Dated Feb. 8, 2010 in U.S. Appl. No. 10/832,035.
Office Action Dated Jan. 23, 2008 in U.S. Appl. No. 10/832,004.
Notice of Allowance Dated Dec. 2, 2008 in U.S. Appl. No. 10/832,004.
Office Action Dated Apr. 9, 2007 in U.S. Appl. No. 10/889,786.
Office Action Dated Sep. 10, 2007 in U.S. Appl. No. 10/889,786.
Office Action Dated Mar. 24, 2008 in U.S. Appl. No. 10/889,786.
Final Office Action Dated Dec. 23, 2008 in U.S. Appl. No. 10/889,786.
Office Action Dated Feb. 28, 2008 in U.S. Appl. No. 10/889,817.
Office Action Dated Aug. 26, 2008 in U.S. Appl. No. 10/889,817.
Final Office Action Dated Feb. 27, 2009 in U.S. Appl. No. 10/889,817.
Office Action Dated Jun. 1, 2007 in U.S. Appl. No. 10/889,787.
Office Action Dated Oct. 17, 2007 in U.S. Appl. No. 10/889,787.
Notice of Allowance Dated May 5, 2008 in U.S. Appl. No. 10/889,787.
Office Action Dated Aug. 17, 2006 in U.S. Appl. No. 10/832,005.
Final Office Action Dated Jan. 24, 2007 in U.S. Appl. No. 10/832,005.
Office Action Dated Jan. 25, 2008 in U.S. Appl. No. 10/889,818.
Notice of Allowance Dated Jul. 16, 2008 in U.S. Appl. No. 10/889,818.
Notice of Allowance Dated Apr. 16, 2009 in U.S. Appl. No. 12/171,779.
Final Office Action, U.S. Appl. No. 10/734,764, filed Dec. 9, 2010.
Notice of Allowance, U.S. Appl. No. 10/887,518, filed Nov. 22, 2010.
Office Action, U.S. Appl. No. 11/766,863, filed Jul. 23, 2010.
Office Action, U.S. Appl. No. 12/056,333, filed Aug. 23, 2010.
Office Action, U.S. Appl. No. 12/058,672, filed Oct. 12, 2010.
Office Action, U.S. Appl. No. 12/169,823, filed Oct. 6, 2010.
Office Action, U.S. Appl. No. 12/240,395, filed Aug. 24, 2010.

* cited by examiner

| Grammar 308 | | | | |
|---|---|---|---|---|
| Content Type 410 | Key Phrase 516 | Presentation Action Identifier 518 | Structural Element Identifier 318 | Parameter 520 |
| WP | page down | PgDn |  | null |
| WP | page up | PgUp |  | null |
| WP | go to page | goToPage |  | integer |
| WP | next paragraph | nextParagraph | <paragraph> | null |
| WP | go to heading | nextHeading | <heading> | string |
| WP | previous bullet | prevBullet | <bullet> | null |
| WP | go to subtitle | goToSubtitle | <subtitle> | string |

FIG 4

DYNAMIC MEDIA CONTENT FOR COLLABORATORS WITH CLIENT ENVIRONMENT INFORMATION IN DYNAMIC CLIENT CONTEXTS

CROSS-REFERENCE TO RELATED APPLICATION

This application is a continuation application of and claims priority from U.S. patent application Ser. No. 10/832,035, filed on Apr. 26, 2004.

BACKGROUND OF THE INVENTION

1. Field of the Invention

The field of the invention is data processing, or, more specifically, methods, systems, and products for delivering dynamic media content for collaborators.

2. Description of Related Art

Technology today includes the capability of sensing client locations and retaining persistent data describing clients, devices and persons, and the environments in which they reside, work, and travel. Technology provides the capability of detecting changes in clients' environments including their locations. Current technology provides the capability of structuring information needed to respond meaningfully to such changes, including, for example, the capabilities of the SGML (Standard Generalized Markup Language), XML (eXtensible Markup Language), and HTML (HyperText Markup Language).

For any particular response, however, there is a wide variety of collaborator purpose, organizational affiliation, technical knowledge, security authorization, and so on, across almost any dimension in which responders may vary. Targeting content for such a heterogeneous set of collaborators is typically a manual process today in which providers create wholly separate presentations for each type of collaborator, and the content of each such presentation is reduced to the lowest common denominator of any particular group. There is a substantial need for improved coordination in responding to changes in clients' locations and environments as well as improvements in multimedia presentation systems useful by responding collaborators.

SUMMARY OF THE INVENTION

Methods, systems, and computer program products are described for delivering dynamic media content to collaborators that include providing collaborative event media content, where the collaborative event media content further comprises a grammar and a structured document; acquiring data representing a client's environmental condition; storing, in the context server in a data structure comprising a dynamic client context for the client, the data representing a client's environmental condition; detecting an event in dependence upon the dynamic client context; identifying one or more collaborators in dependence upon the dynamic client context and the event; selecting from the structured document a classified structural element in dependence upon an event type and a collaborator classification; and transmitting the selected structural element to the collaborator.

In some embodiments, acquiring data representing a client's environmental condition includes receiving asynchronously from environmental sensors data representing a client's environmental condition. In some embodiments, the dynamic client context includes network addresses for environmental sensors for a client and acquiring data representing a client's environmental condition includes the context server's polling of the environmental sensors for the client. In typical embodiments, detecting an event in dependence upon the dynamic client context includes detecting a change in a value of a data element in the dynamic client context and applying an event detection rules base to the dynamic client context.

In typical embodiments, providing collaborative event media content includes creating, in dependence upon original media content, a structured document, where the structured document includes one or more structural elements, and creating a grammar for the collaborative event media content, where the grammar includes grammar elements each of which includes an identifier for at least one structural element of the structured document.

Such embodiments typically also include classifying a structural element of the structured document according to a presentation attribute. In such embodiments, classifying a structural element typically includes identifying a presentation attribute for the structural element; identifying a classification identifier in dependence upon the presentation attribute; and inserting the classification identifier in association with the structural element in the structured document.

In many embodiments, identifying collaborators includes identifying a collaborator in dependence upon collaborator presence on a instant messaging network. In many embodiments, identifying one or more collaborators in dependence upon the identified event includes identifying a collaborator in dependence upon client location. In typical embodiments, transmitting the selected structural element to the collaborator includes selecting a data communications protocol for communications with a collaborator; inserting the selected structural element in a data structure appropriate to the data communications protocol; and transmitting the data structure to the collaborator according to the data communications protocol.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 4 sets forth an exemplary data structure in which a grammar may be implemented according to embodiments of the present invention.

DETAILED DESCRIPTION OF EXEMPLARY EMBODIMENTS

Introduction

The present invention is described to a large extent in this specification in terms of methods for creating a voice response grammar from a presentation grammar. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Delivering Dynamic Media Content to Collaborators

Figure 1:
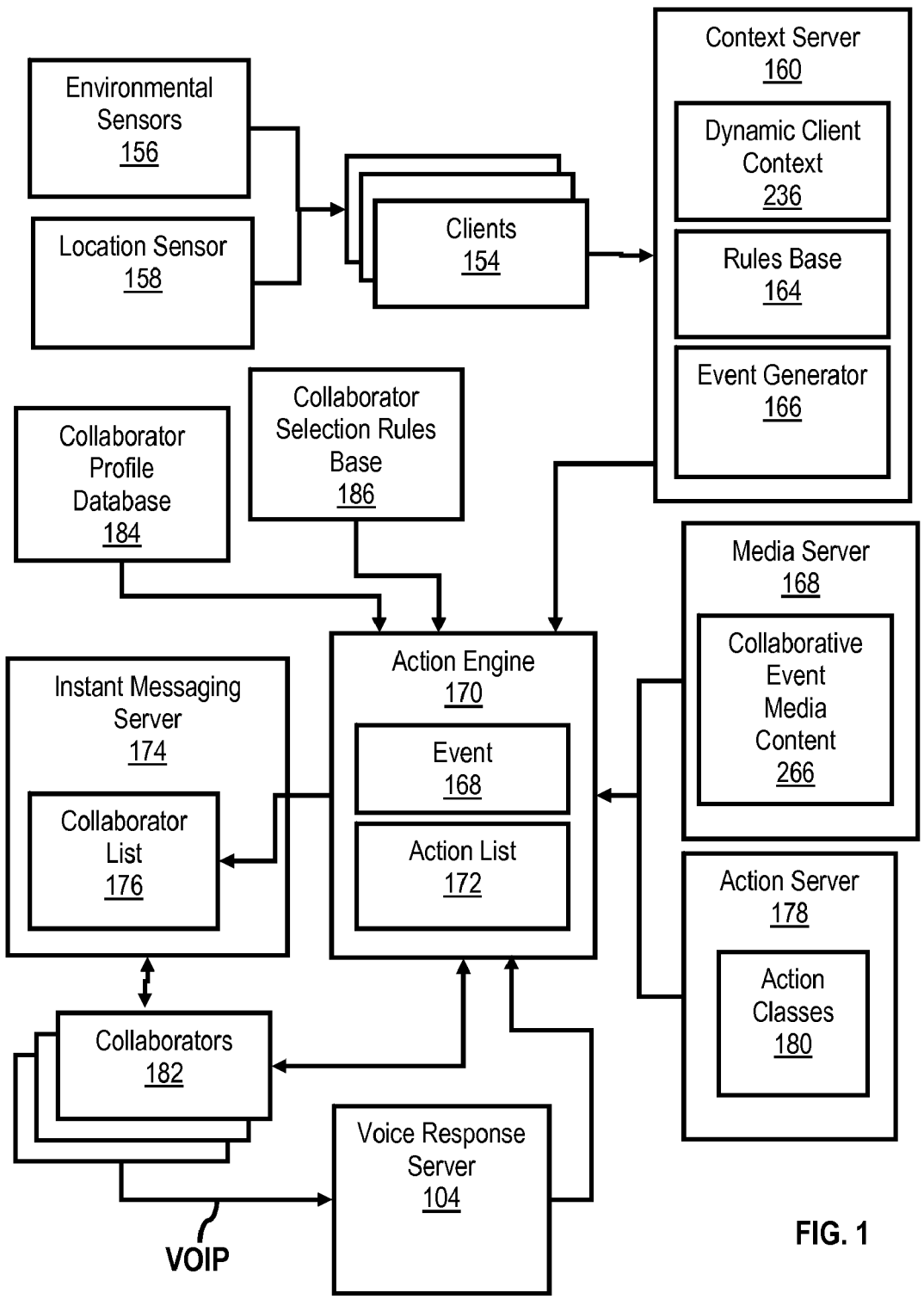
FIG. 1 sets forth a block diagram of an exemplary system operable according to embodiments of the present invention to deliver dynamic media content to collaborators.

Exemplary methods, systems, and products are described for delivering dynamic media content to collaborators with reference to the accompanying drawings, beginning with FIG. 1. FIG. 1 sets forth a block diagram of an exemplary system operable according to embodiments of the present invention to deliver dynamic media content to collaborators. The system of FIG. 1 operates generally to deliver dynamic media content to collaborators by providing collaborative event media content (266), where collaborative event media content generally includes a grammar and a structured document; generating a dynamic client context (236) for a client (154); detecting an event (168) in dependence upon the dynamic client context (236); identifying one or more collaborators (182) in dependence upon a dynamic client context (236) and the event (168); selecting from a structured document in the collaborative event media content (266) a classified structural element in dependence upon an event type and a collaborator classification; and transmitting the selected structural element to the collaborator.

The system of FIG. 1 includes environmental sensors (156) and location sensors (158) that provide data describing a client (154) and the client's environment. Environmental sensors are any sensor capable of detecting or measuring in electronic form one or more environmental conditions of a client, including factors and variables near the client's physical location. Examples of environmental sensors include smoke detectors, thermometers, barometers, motion detectors, light sensors, metal detectors, chemical sensors, and so on, as will occur to those of skill in the art. Location sensors are any mechanism capable of indicating in electronic form at least a useful approximation of the client's physical location. Examples of location sensors include GPS (Global Positioning System) receivers, network routers configured with their own physical locations, and network routers configured with clients' physical locations.

The system of FIG. 1 also includes clients (154) that operate by acquiring data that describes the client and the client's environment and communicates that data to a context server (160) for storage in a dynamic client context. Clients are any automated computing machinery capable of communicating client location and client environmental data to a context server, including, for example, personal computers, laptops, personal digital assistants ("PDAs"), network-enabled mobile telephones, and so on, as will occur to those of skill in the art. There is no requirement that a client be associated with a person, although they often are. On the other hand, however, a client may be the computer operating a security system in a building with smoke detectors, thermometers, and motion sensors. Context server (160) is any data communications server capable of accepting data communications messages from clients and providing data processing services in response to such messages. Such messages may be communicated according to any useful data communications protocol as will occur to those of skill in the art, including for example HTTP (the HyperText Transport Protocol), and the messages may include, for example, HTTP 'REQUEST' messages and HTTP 'POST' messages.

Data processing services provided by context server (160) include detecting an event (168) in dependence upon the dynamic client context (236). Detecting an event may be carried out by detecting a change in a value of a data element in a dynamic client context (236) and applying an event detection rules base (164) to the dynamic client context. Context server (160) includes an event generator (166), a software module programmed to create an event object (168) and hand it off to action engine (170) when an event is detected.

An event is a change in one or more values of data elements in a dynamic client context that meet event criteria such as threshold requirements or rules in a rules base. A mere change in the value of a data element may not be enough to constitute an event. A change in environmental temperature from 72 degrees Fahrenheit to 73 degrees Fahrenheit, for example, may generally be ignored by an event generator. Consider the following event generation rule, however:

IF a client's physical location is in a building
AND IF the temperature in the building exceeds 105 degrees Fahrenheit
AND IF a smoke detector in the building is activated
THEN event type is set to 'FIRE'

In this example, the client's physical location, the environmental temperature for the client, and the status of the smoke detector where the client is located are all stored in data elements in a dynamic client context for the client. In this example, event generator applies the exemplary rule from rules base (164) and receives a return event type of 'FIRE,' which event generator (166) is programmed to pass to an object oriented parameterized event creation factory method in an event factory object. The event factory instantiates and returns an object of a concrete event class named, for example, fireEvent, derived from an abstract event class. The abstract class declares member data elements and member methods needed by all concrete event classes in the system. Each concrete event class is then augmented with member data elements and member methods as needed to address particular kinds of events, fires, automobile accidents, hazardous materials spills identified by chemical sensors, firearms presence identified by metal detectors, burglaries identified by motion detectors, and so on. Exemplary concrete event class names therefore may include not only fireEvent, but also carWreckEvent, hazMatEvent, gunEvent, burglaryEvent, and so on, as will occur to those of skill in the art.

When an event generator instantiates an event object, the event generator typically may include in the event object a reference to one or more dynamic client context objects, including the current dynamic client context object whose changes in data values triggered the event, but also one or more previous dynamic client context objects so that an action engine may have previous data values as needed. Alternatively, a concrete event class may include all the data elements needed for action preparation, so that only the data values are loaded from the pertinent dynamic client contexts rather than including the dynamic client contexts themselves, object built from them, or object oriented references or pointers to them.

Event (168), by the time it arrives in action engine (170) contains all the data needed to identify the type of event and develop actions in response to the event, including data from or references to objects built from pertinent dynamic client contexts (236). Action engine (170) is programmed to apply collaborator selection rules (186) to the event type identified in event (168) to assemble from collaborator profile database (184) a list (176) of collaborators for the event. Collaborator profiles are data structures such as records in a collaborator profile database (184) that include data elements describing a collaborator, including, for example, collaborator name, collaborator identification code, collaborator physical address, collaborator type (EMS, police, wife, accountant, lawyer, HazMat Responder, and so on), and a list of one or more event types in which a collaborator may collaborate. Examples of collaborator selection rules include the following:

Select collaborators according to event type.
Select only collaborators that are currently 'present' for receipt of instant messages on an instant messaging service.
If, for an event type, there is more than one collaborator of a collaborator type, select all collaborators of that type.
If, for an event type, there is more than one collaborator of a collaborator type, select the first collaborator of that type found in the collaborator profile database.
If, for an event type, there is more than one collaborator of a collaborator type, select the collaborator of that type whose physical location is closest to the client's.

The collaborator list (176) is installed in instant messaging server (174) so that all collaborators in the list are 'present' for instant messaging and all collaborators on the list are joined in a messaging session so that any messages from any collaborator is seen immediately on the communications devices of all collaborators (182). Examples of instant messaging protocols useful with various embodiments of the present invention include the Instant Messaging and Presence Protocol ("IMPP") specified by the IMPP Working Group of the Internet Engineering Task Force and the Mitre Corporation's Simple Instant Messaging and Presence Service ("SIMP"). Such instant messaging services generally define and support 'presence services' that provide indications whether an instant messaging client is on-line. Such services also allow users, in this case collaborators, to subscribe to one another's messaging, so that messages to one collaborator are also communicated to other subscribing collaborators. Action engine (170), in providing the list (176) of collaborators for an event (168) to the instant messaging service (174), effects a mutual subscription among the collaborators so listed, so that messages among the collaborators are communicated to all collaborators for that event.

Collaborators (182) are effectively represented in the system of FIG. 1 by their communications devices, which again may or may not be associated directly with a particular person. A 'collaborator' may be, for example, a console in a 911 service staffed by more than one person, or a passive, unmanned display device may be registered as a collaborator for an event type. It is generally expected, however, that a collaborator is a person participating, collaborating, in responding to an event by use of a data communications device connected to an instant messaging session that is established for the purpose of helping collaborators so respond.

In the system of FIG. 1, action engine (170) is programmed to request of action server (178) an action list for an event type. Action server (178) operates an action factory (not shown) that generates from concrete action classes (180) one or more action objects, places references to the action object in a list object (172), and returns the list object (172) to action engine (170). Action engine (170) then proceeds generally to execute the actions identified in the list (172). Examples of actions include transmitting to collaborators a description of the event that triggered the current action list, transmitting to collaborators data from a pertinent dynamic client context, transmitting to collaborators Materials Data Sheets for use in HazMat responses, transmitting to collaborators maps showing a client's physical location, transmitting to collaborators travel directions to a client's physical location, and so on as will occur to those of skill in the art.

The system of FIG. 1 includes a voice response server (104) through which collaborators (182) may issue presentation control instructions to action engine (170). Presentation control instructions represent instructions or requests from collaborators for particular collaborative event media content. A collaborator may, for example, request a map of the neighborhood of a client's physical location, directions from the collaborator's present location to the client's location, Materials Data Sheets for hazmat responses, and so on. Voice response server (104) creates presentation control instructions for action engine (170), for example, by receiving through a VOIP (Voice Over Internet Protocol) channel from a collaborator a key phrase and optional parameters for invoking a presentation action and parsing the key phrase and parameters against a grammar into a presentation control instruction.

Figure 2:
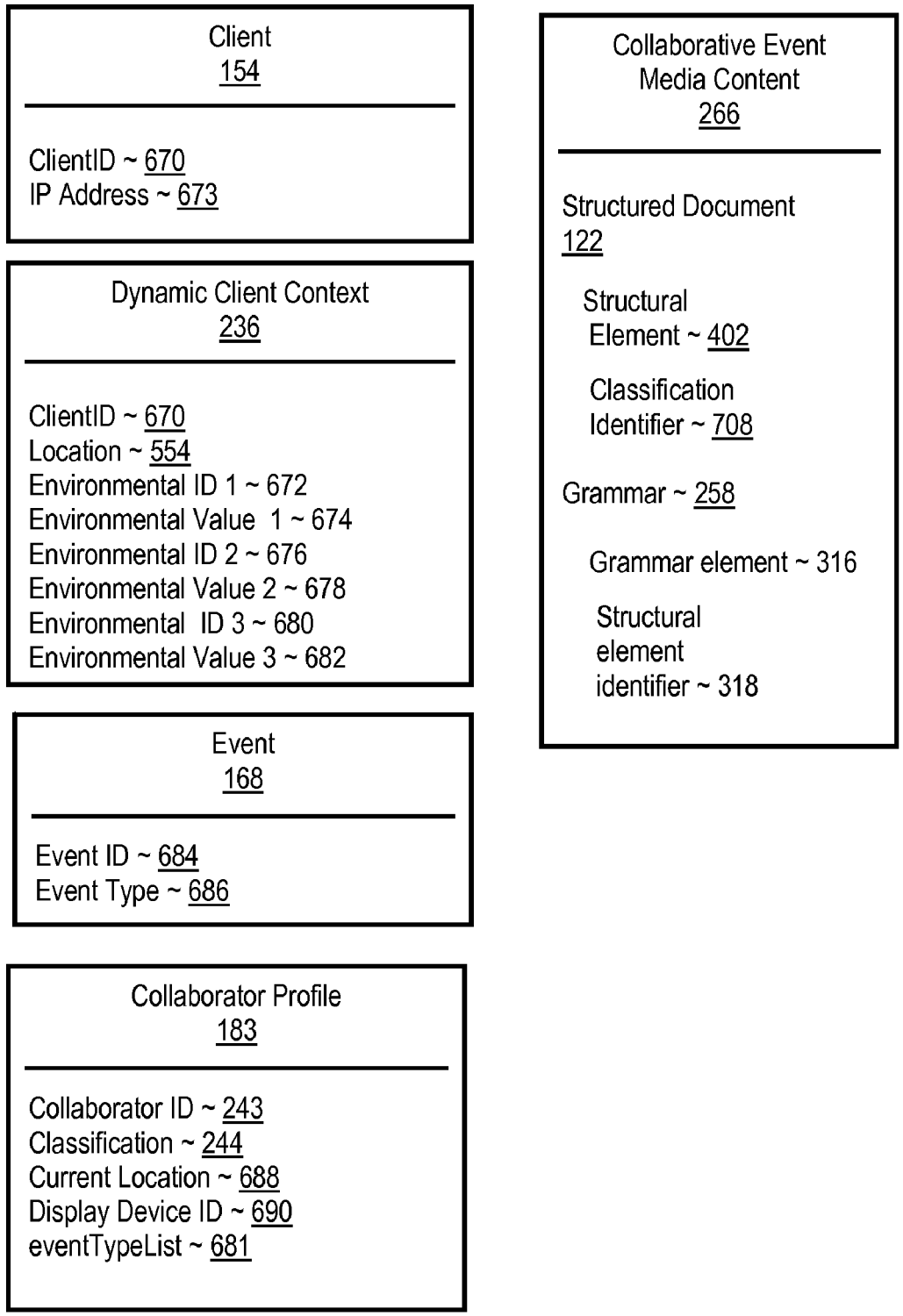
FIG. 2 sets forth data structure diagrams illustrating exemplary data structures useful in various embodiments of the present invention to deliver dynamic media content to collaborators.

For further explanation, FIG. 2 sets forth data structure diagrams illustrating exemplary data structures useful in various embodiments of the present invention to deliver dynamic media content to collaborators. The exemplary data structures of FIG. 2 include a client record (154) representing a client. As discussed above, a client is any automated computing machinery capable of communicating client location and client environmental data to a context server, including, for example, personal computers, laptops, personal digital assistants ("PDAs"), network-enabled mobile telephones, and so on, as will occur to those of skill in the art. The client record (154) of FIG. 2 includes a clientID field (670) that uniquely identifies the client and an IP address field (673) that includes a network address of the client.

The exemplary data structures of FIG. 2 also include a dynamic client context record (236) that represents the client and the client's surrounding environment. The dynamic client context record (236) of FIG. 2 includes a client ID (670) identifying the client and a location field (554) containing the location of the client. The location of the client may be represented as a set of coordinates, a physical address, a building and room number, or any other representation of client location that will occur to those of skill in the art. The dynamic client context record (236) of FIG. 2 includes a data storage for three sets of environmental IDs (672, 676, 680) and their corresponding environmental values (674, 678, 682). Environmental IDs uniquely identify a particular environmental condition such as temperature, humidity, barometric pressure and so on as will occur to those of skill in the art. Environmental values (674, 678, 682) represent the current state of the environmental conditions. Environmental values are typically measured in electronic form by one or more environmental sensors and reported to a client. Examples of environmental sensors include smoke detectors, thermometers, barometers, motion detectors, light sensors, metal detectors, chemical sensors, and so on, as will occur to those of skill in the art. Although the dynamic client context (236) of FIG. 2 includes data storage for only three environmental IDs and their corresponding values there is no such limitation in the scope of the present invention. In fact, dynamic client contexts according to the present invention often contain values for many kinds of environmental conditions and therefore there is no limitation on the number of environmental conditions that can be represented in a dynamic client context as will occur to those of skill in the art.

The exemplary data structures of FIG. 2 also include an event record (168) representing a change in one or more values of data elements in a dynamic client context that meet event criteria such as threshold requirements or rules in a rules base. The event record (168) of FIG. 2 includes an event ID (684) uniquely identifying the event and an event type (686) that identifies the kind of event represented by the event record. Examples of event types include 'fire,' 'rain,' 'thunder' and so on as will occur to those of skill in the art.

The data structures of FIG. 2 include an exemplary collaborator profile (183) representing a collaborator. As discussed above, collaborators can be persons, devices, or processes and are often represented by their communications devices. A 'collaborator' may be, for example, a console in a 911 service staffed by more than one person, or a passive, unmanned display device may be registered as a collaborator for an event type. It is generally expected, however, that a collaborator is a person participating, collaborating, in responding to an event by use of a data communications device connected to an instant messaging session that is established for the purpose of helping collaborators so respond. The collaborator profile (183) of FIG. 2 includes a collaborator ID (243) uniquely identifying the collaborator (244). The exemplary collaborator profile (183) of FIG. 2 includes data storage for a classification (244) for the collaborator. A collaborator classification is type code describing the collaborator and used to both select the collaborator in response to an event as well as to select structural elements of collaborative event media content to present to the collaborator. The exemplary collaborator profile (183) of FIG. 2 includes the collaborators current location (688) and data storage for one or more display device IDs (690) identifying one or more display devices available to the collaborator on which structural element of collaborative event media content can be displayed to the collaborator. The exemplary collaborator profile (183) also includes an eventTypeList (681) that includes event types for collaborator selection as discussed in more detail below.

The exemplary data structures of FIG. 2 includes collaborative event media content (266) representing media content available for dynamic delivery to a collaborator in response to an event. The collaborative event media content of FIG. 2 includes a structured document (122) which includes a plurality of structural elements (402) and classification identifies (708) for the structural elements. Examples of structural elements include pages, paragraphs, bullet points, graphical images, and so on as will occur to those of skill in the art. A classification identifier is an identifier that classifies a structural element for a particular collaborator. That is, classification identifiers are used to select particular structural elements for delivery to particular collaborators.

The collaborative event media content includes a grammar (258) associated with the structured document (122) that includes grammar elements (316) and structural element identifiers (318). A grammar (258) is a data structure associating key phrases with presentation actions that facilitates a collaborator navigating the structured document (122) of collaborative event media content using speech commands. In the example of FIG. 2, the grammar (258) includes grammar elements (316) each of which includes an identifier (318) for at least one structural element (402) of the structured document (122).

Providing Collaborative Event Media Content

Figure 3:
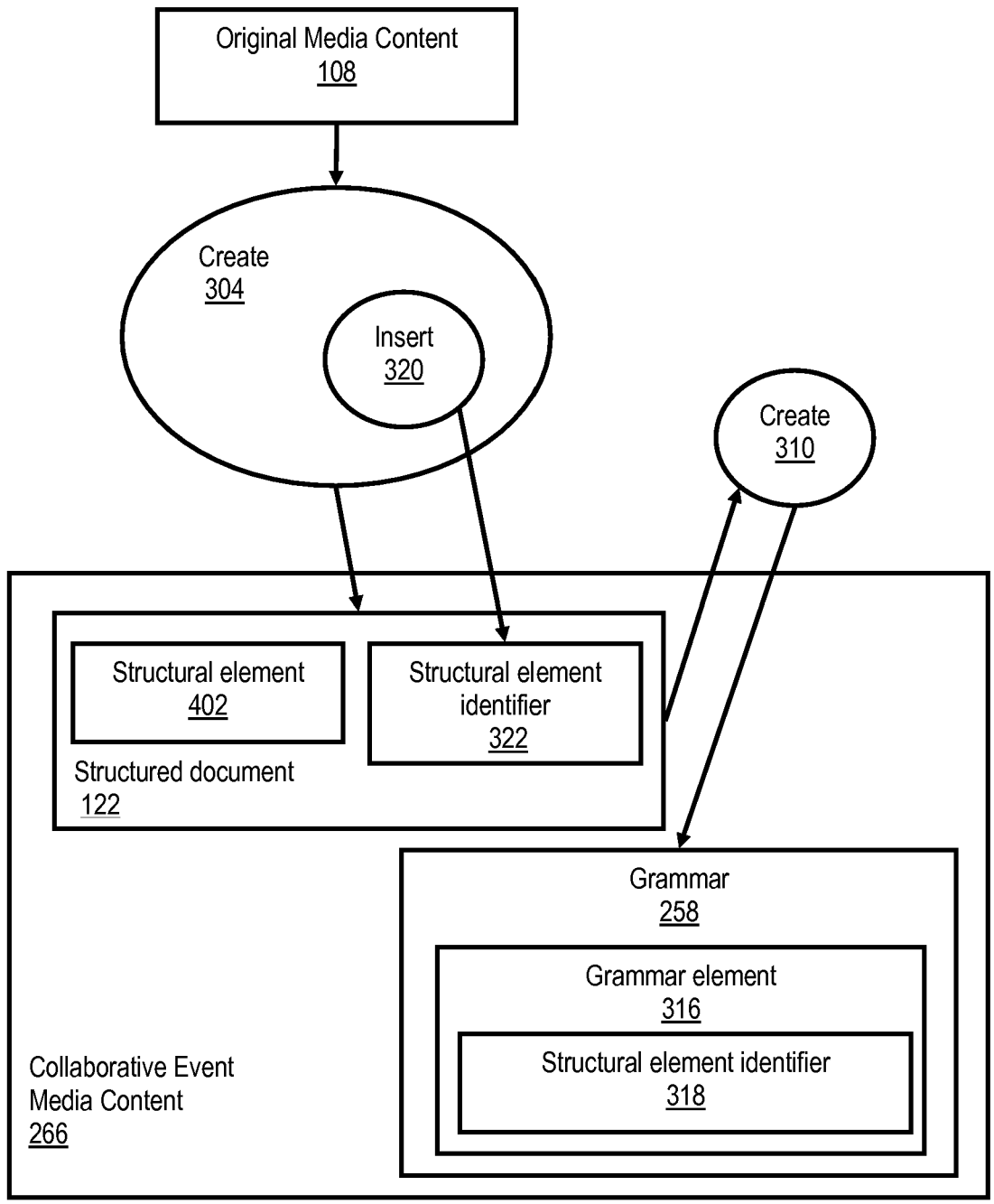
FIG. 3 sets forth a data flow diagram illustrating an exemplary method for providing collaborative event media content.

For further explanation, FIG. 3 sets forth a data flow diagram illustrating an exemplary method for providing collaborative event media content that includes creating (304), in dependence upon original media content (108), a structured document (122). In the example of FIG. 3, the structured document (122) includes one or more structural elements (402). Examples of structural elements include pages, paragraphs, slides, bullets points, graphic images, video clips and so on as will occur to those of skill in the art. In the method of FIG. 3, creating (304) a structured document (122) includes inserting (320) in the structural document (122) structural element identifiers (322) for the structural elements (402). A structural element identifier (302) is an identifier such as for example a tag in an XML document or other identifier in a structured document that identifies a structural element.

The method of FIG. 3 also includes creating (310) a grammar (258) for the collaborative event media content (266). A grammar (258) is a data structure associating key phrases with presentation actions that facilitates a collaborator navigating the structured document (122) of the collaborative event media content (266) using speech commands. A presentation action is an action controlling the display of one or more structural elements of a structured document. For example, a grammar may include a key phrase 'next bullet' that is associated with a presentation action that searches the structured document for the next structural element identified as a bullet point and displays that structural element. In such and example, to invoke the display of the next bullet point of the structured document, a collaborator need only speak the key phrase 'next bullet.'

For further explanation FIG. 4 sets forth an exemplary data structure (258) in which a grammar may be implemented according to embodiments of the present invention. The grammar of FIG. 4 includes several grammar elements (502-514) for a content type. A content type represents the kind of media to be directed with spoken key phrases of the grammar. In this example, the content type is taken as a word processing document having structural elements that include pages, paragraphs, bullets, titles, subtitles, and so on, and the data structure includes a column for an identifier (318) of a structural element, a column for a key phrase (516) for formulating a presentation control instruction for invoking a presentation action to display the collaborative media content, and a column for a presentation action identifier (518) representing a presentation action. The exemplary data structure of FIG. 4 also includes a column for a data indication whether a presentation control instruction requires a parameter. The exemplary grammar entries for presentation action identifiers PgDn (502), PgUp (504), nextParagraph (508), and prevBullet (512) have parameter (520) values of 'null,' signifying that a voice response server parsing their key phrases into presentation control instructions is not to parse a parameter for a presentation control instruction. The exemplary grammar entries for presentation action identifiers goToPage (506), nextHeading (510), and goToSubtitle (514), however, have parameter (520) values of 'integer' and 'string,' signifying that a voice response server parsing their key phrases into presentation control instructions is to seek to parse for each of them respectively an integer parameter, a string parameter, and a string parameter.

Creating a grammar (258) such as the grammar of FIG. 4 typically includes identifying the content type of at least a portion of the original media content and associating, in dependence upon the content type, a key phrase with a presentation action. Identifying the content type of at least a portion of the original media content can be carried out by identifying the content type in dependence upon a filename extension, in dependence upon document header elements, or any other way of identifying the content type that will occur to those of skill in the art.

Methods of providing collaborative event media content are further explained with an exemplary use case. Consider the following example of a structured document:

```
<document>

<p id="1">a paragraph</p>
        <p id="2">another paragraph</p>
        <image id="1">a graphic image</image>

<p id="3">a paragraph</p>
        <p id="4">another paragraph</p>
        <image id="2">another graphic image</image>

</document>
```

And assume that this exemplary structured document is associated in a providing collaborative event media content with the following grammar:

TABLE 1

| | Grammar | | |
|---|---|---|---|
| Key Phrase | Presentation Action Identifier | Structural Element Identifier | Parameter |
| page down | PgDn |  | null |
| page up | PgUp |  | null |
| go to page | goToPage |  | integer |
| next paragraph | nextParagraph | <p> | null |
| go to paragraph | goToParagraph | <p> | integer |
| next image | nextImage | <image> | null |
| go to image | goToImage | <image> | integer |

In this example, collaborative event media content is transmitted to a collaborator and the first page of the structured document is displayed on a collaborator's communications device such as for example a voice response server enabled PDA. When the collaborator speaks the words "page down," a voice response server on the PDA parses the speech into a presentation control instruction having a presentation control identifier named "PgDn" and communicates the presentation control instruction to display the next page, in this example, page 2 of the example structured document. Similarly, when the first page of the structured document is displayed, a collaborator's speaking the words "go to paragraph 4" results in changing the display to show paragraph 4 on the second page of the document. And, when the first page is on display for the collaborators the collaborator speaks the words "next image," a collaborator's display device changes the display to show image 2 on the second page of the document.

Classifying Structural Elements in Collaborative Event Media Content

Figure 5:
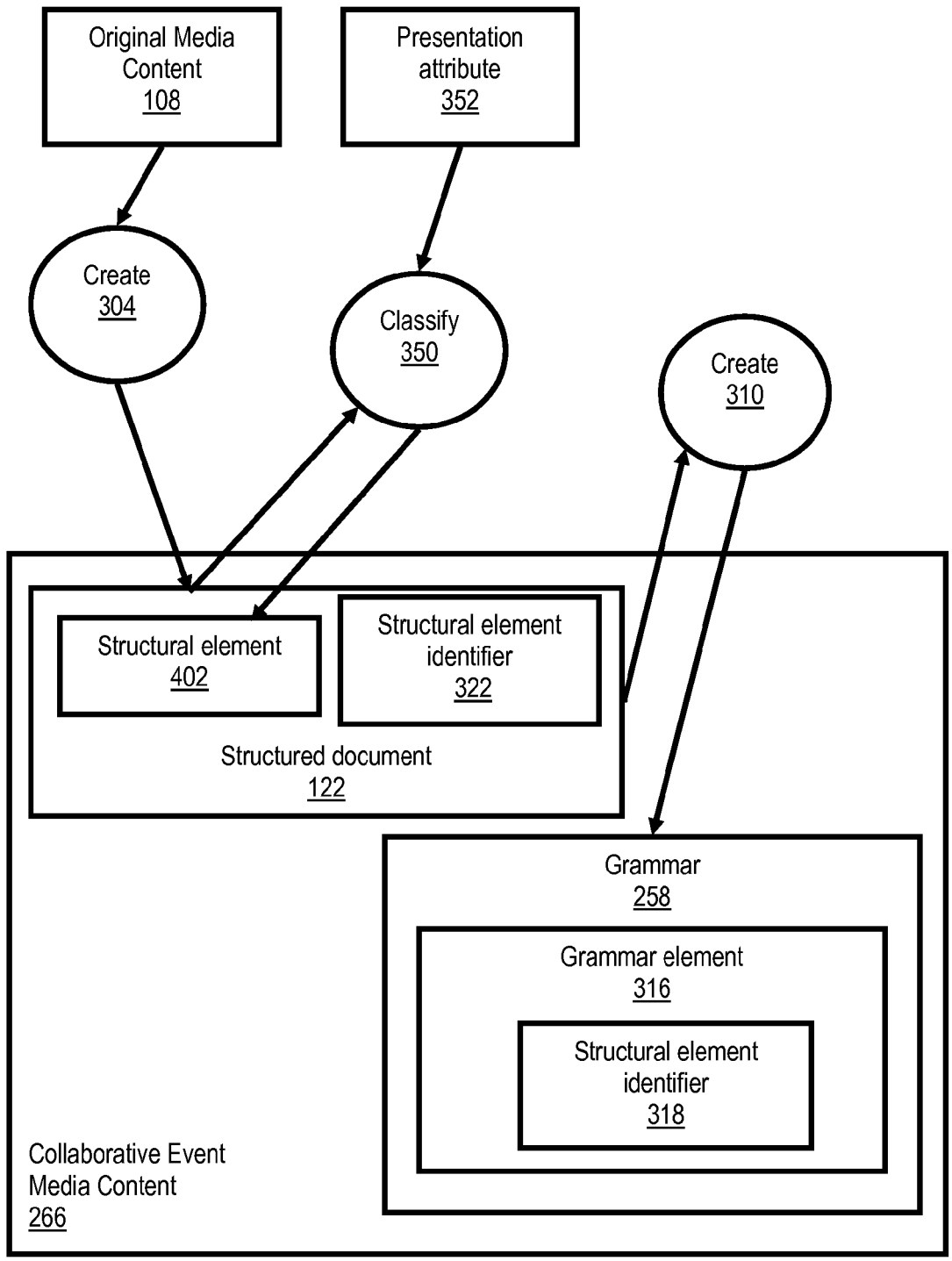
FIG. 5 is a data flow diagram illustrating a further method for providing collaborative event media content.

FIG. 5 is a data flow diagram illustrating a further method for providing collaborative event media content (266). The method of FIG. 5 includes creating (304), in dependence upon an original media content (108), a structured document (122) comprising one or more structural elements (402), as explained in above. The method of FIG. 5 also includes classifying (330) a structural element (402) of the structured document (122) according to a presentation attribute (352). Presentation attributes are generic selection criteria for displaying appropriate structural elements of collaborative event media content to collaborators. Examples of presentation attributes include collaborator's company names, department names, security levels, technical levels, and so on. The method of FIG. 5 also includes creating (310) a grammar (258) for the structured document (122) as described above with reference to FIGS. 3 and 4.

Figure 6:
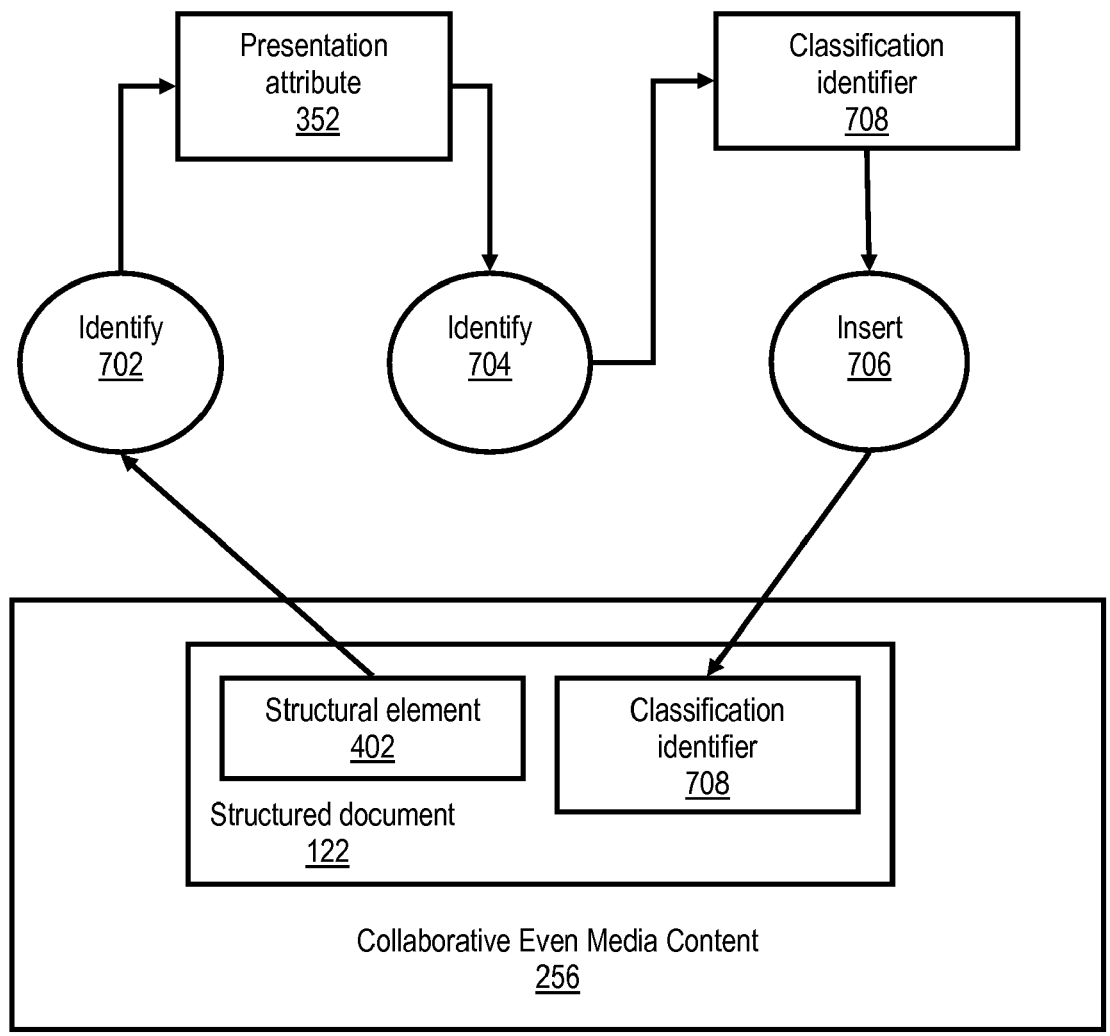
FIG. 6 sets for a data flow diagram illustrating an exemplary method for classifying a structural element.

For further explanation, FIG. 6 sets for a data flow diagram illustrating an exemplary method for classifying a structural element. The method of FIG. 6 includes identifying (702) a presentation attribute (352) for the structural element (402); identifying (704) a classification identifier (708) in dependence upon the presentation attribute (352); and inserting (706) the classification identifier (708) in association with the structural element (402) in the structured document (122). As discussed above with reference to FIG. 5, presentation attributes are generic selection criteria for displaying appropriate structural elements of collaborative event media content to collaborators. Examples of presentation attributes include collaborator's company names, department names, security levels, technical levels, and so on. A classification identifier (708) identifies a collaborators classification. Examples of classifications include any supported data codes describing collaborator classification, including, for example "company=IBM," "department=marketing," "technical level=3," "security level=2," and others as will occur to those of skill in the art.

Figure 7:
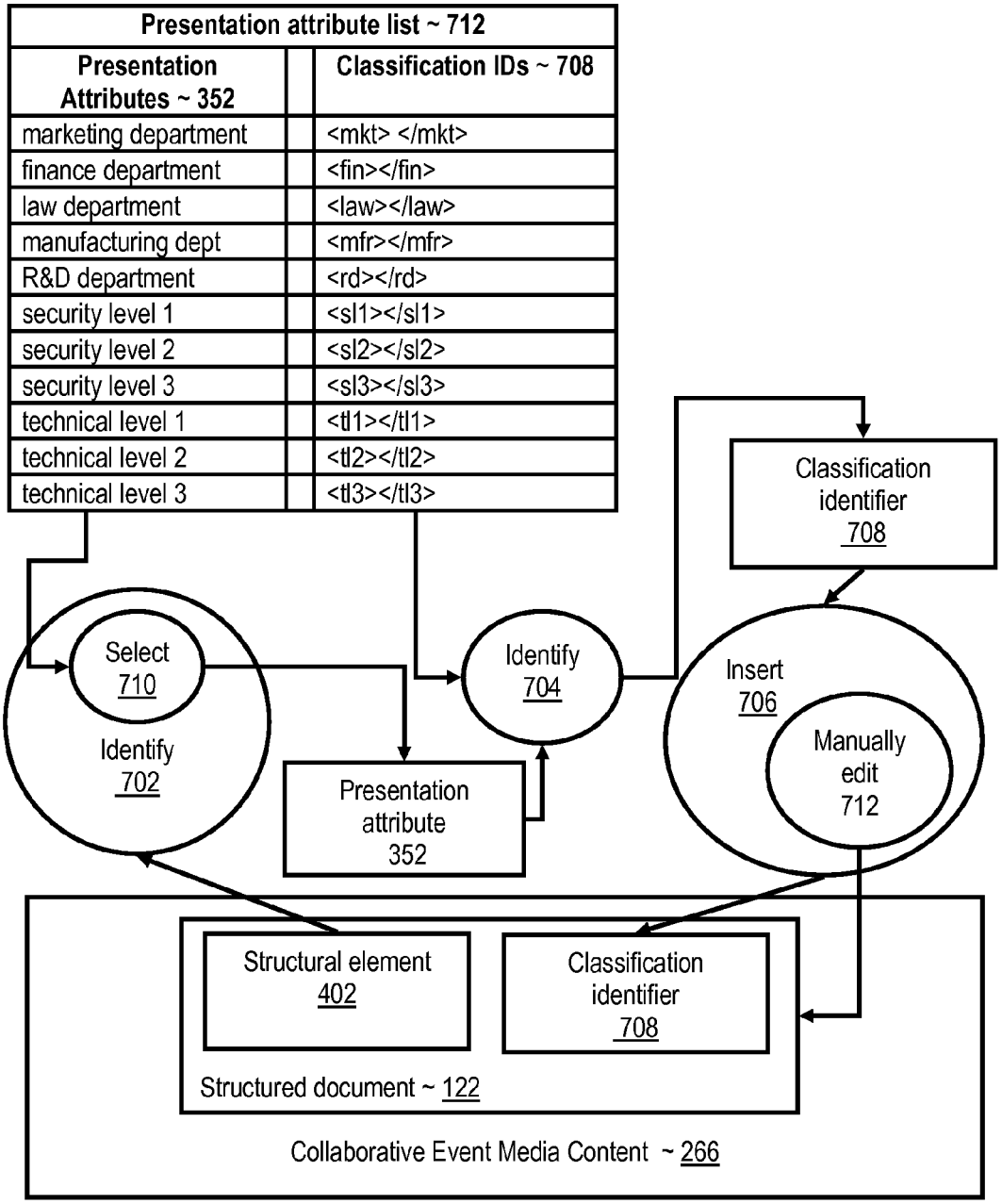
FIG. 7 sets forth a data flow diagram illustrating an exemplary method for classifying a structural element.

For further explanation, FIG. 7 sets forth a data flow diagram illustrating an exemplary method for classifying a structural element in a structured document in which identifying (702) a presentation attribute (352) for the structural element (402) includes selecting (710) a presentation attribute (352) from a list (712) of supported presentation attributes (352). The presentation attribute list (712) of FIG. 7 includes two columns, one column for presentation attributes (352) and another column for associated classification identifiers (708). In the method of FIG. 7, identifying (704) a classification identifier (708) is carried out by identifying a classification identifier (708) associated with the presentation attribute (352) on the list (712). In the method of FIG. 7, inserting (706) the classification identifier (708) includes manually editing (712) the structured document (122) to insert classification identifiers in appropriate locations to classify structural elements in a structured document. For example, a paragraph to be viewed only by collaborators who are members of the marketing department may be classified by tagging the paragraph with <mkt> </mkt>.

Figure 8:
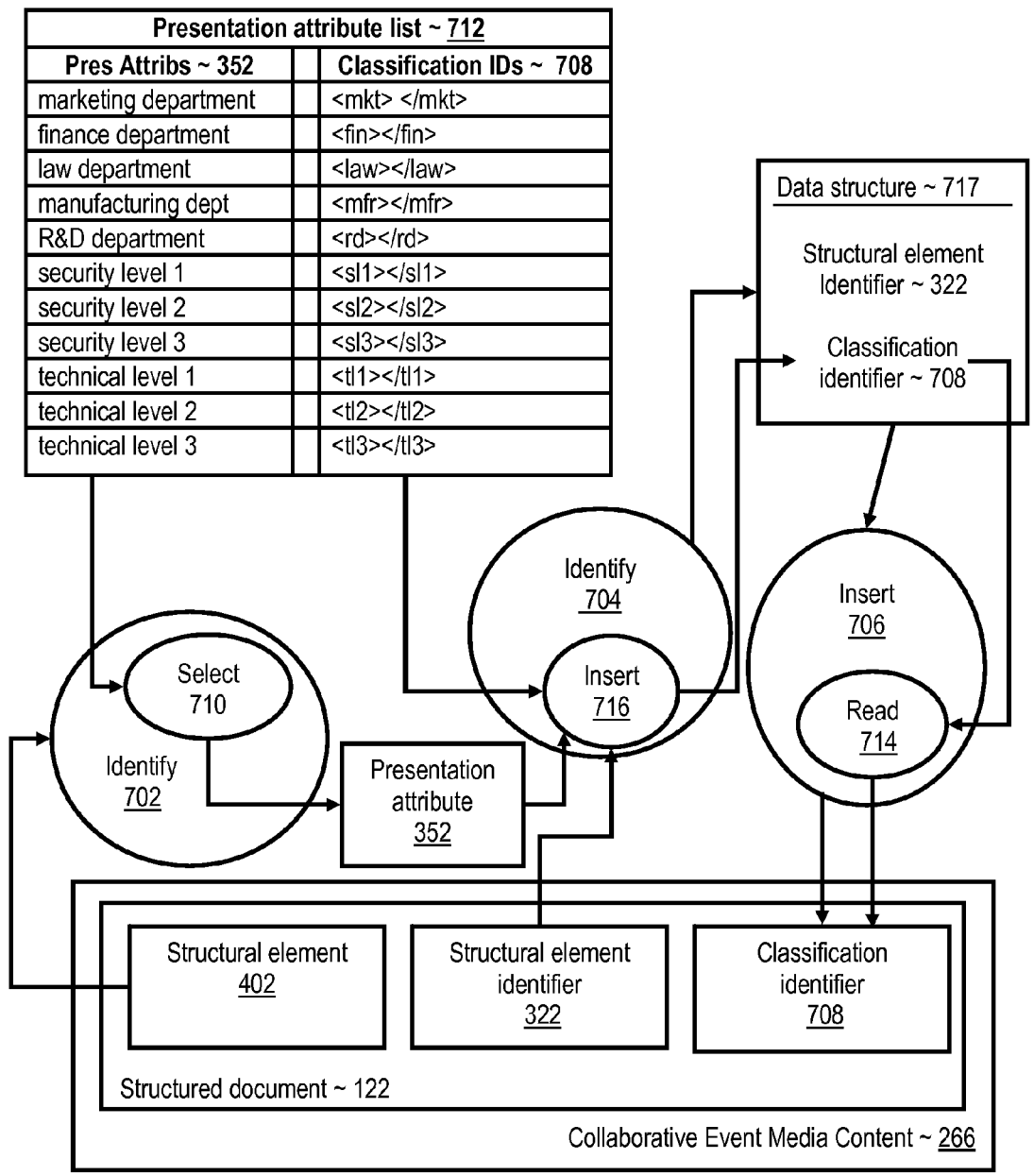
FIG. 8 sets forth a data flow diagram illustrating a further exemplary method for classifying a structural element.

For further explanation, FIG. 8 sets forth a data flow diagram illustrating a further exemplary method for classifying a structural element in a structured document (122) in which identifying (702) a presentation attribute (352) for the structural element (402) includes selecting (710) a presentation attribute (352) from a list (712) of supported presentation attributes (352), the presentation attribute (352) having an associated classification identifier (708). In the method of FIG. 8, identifying (704) a classification identifier (708) includes inserting (716) the classification identifier (708) in a data structure (717) in association with a structural element identifier (322) for the structural element (402). In the method of FIG. 8, inserting (706) the classification identifier (708) in the structured document (122) includes reading (714) the classification identifier (708) from the data structure (717) in dependence upon the structural element identifier (322).

Figure 9:
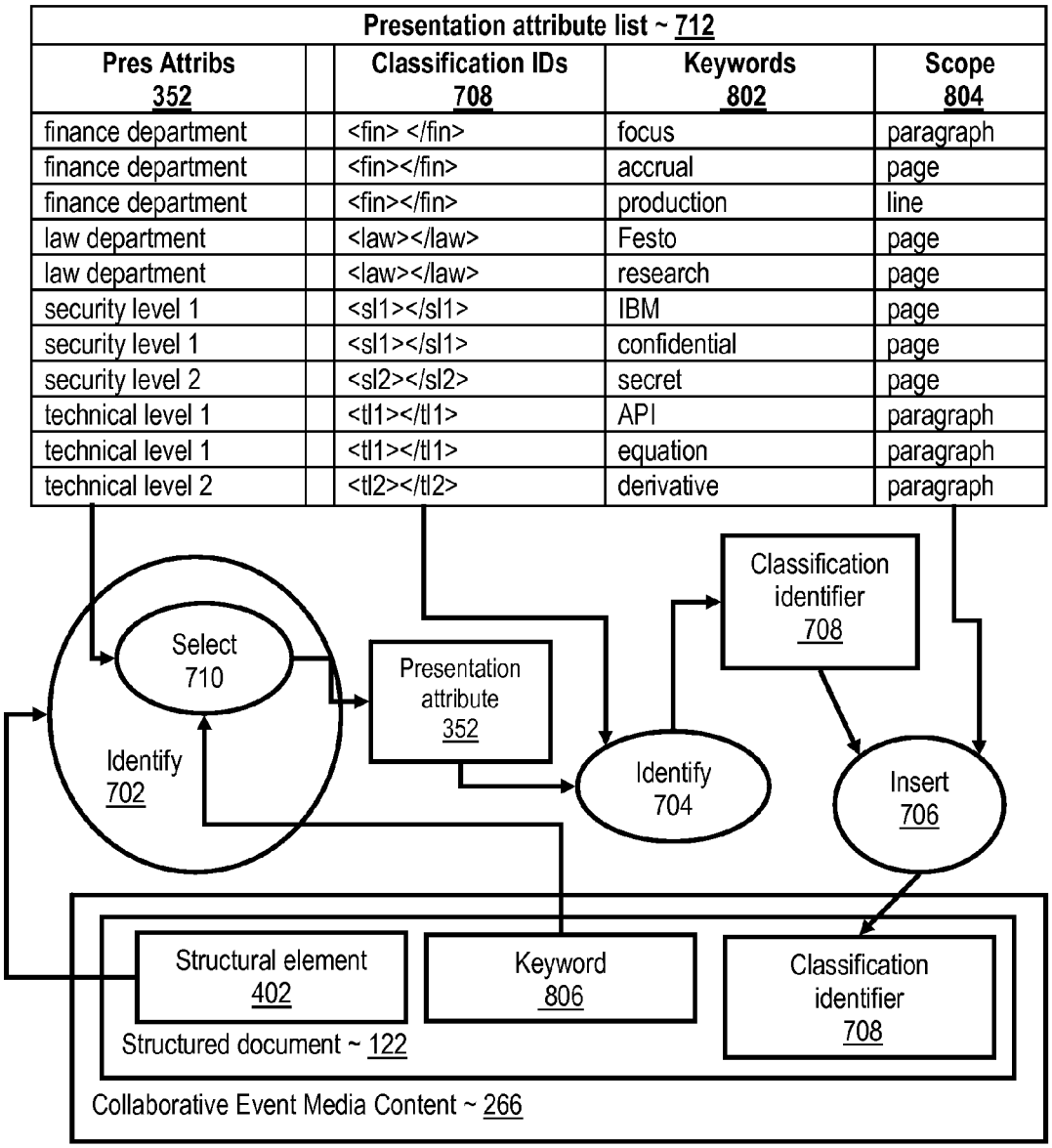
FIG. 9 sets forth a data flow diagram illustrating another exemplary method for classifying a structural element.

For further explanation, FIG. 9 sets forth a data flow diagram illustrating another exemplary method for classifying a structural element in a structured document that includes providing a list (712) of supported presentation attributes (352) including at least one keyword (802) and at least one indication of structural insertion scope (804) for each presentation attribute (352). In the method of FIG. 9, identifying (702) a presentation attribute (352) for the structural element (402) includes selecting (710) a presentation attribute (352) from the list (712) in dependence upon a keyword (806) from the structured document (122). In the method of FIG. 9, identifying (704) a classification identifier (708) is carried out by identifying a classification identifier (708) associated with the presentation attribute (352) on the list (712). In the method of FIG. 9, inserting (706) the classification identifier (708) is carried out by inserting the classification identifier (708) in the structured document (122) according to a structural insertion scope (804) for the selected presentation attribute (352).

Figure 10:
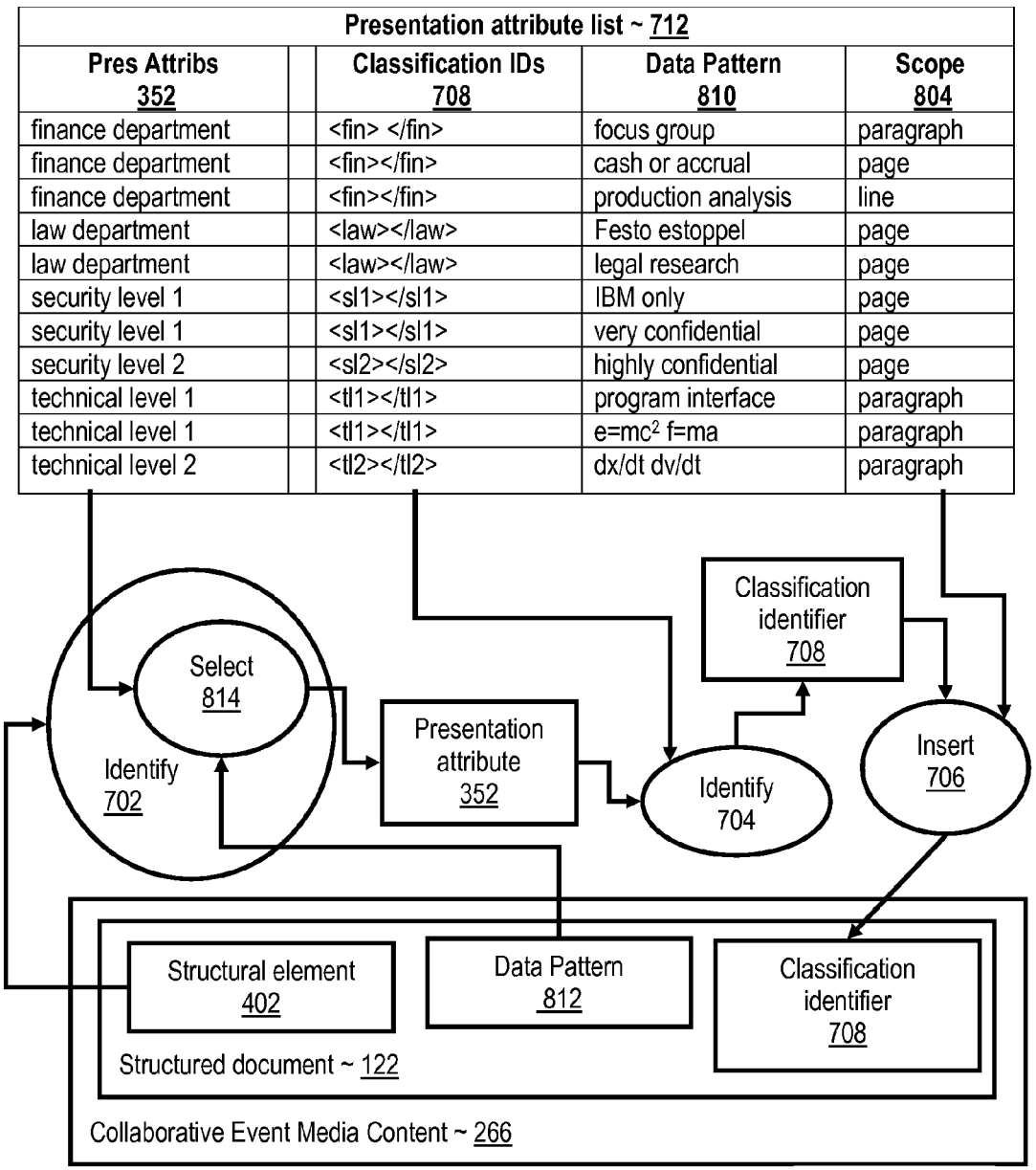
FIG. 10 sets forth a data flow diagram illustrating a further exemplary method for classifying a structural element.

FIG. 10 sets forth a data flow diagram illustrating a further exemplary method for classifying a structural element (402) in a structured document (122) that includes providing a list (712) of supported presentation attributes (352) including at least one data pattern (810) and at least one indication of structural insertion scope (804) for each presentation attribute (352). In the method of FIG. 10, identifying (702) a presentation attribute (352) for the structural element (402) includes selecting (814) a presentation attribute (352) from the list (712) in dependence upon a data pattern (812) from the structured document (122). In the method of FIG. 10, identifying (704) a classification identifier (708) is carried out by identifying a classification identifier (708) associated with the presentation attribute (352) on the list (712). In the method of FIG. 10, inserting (706) the classification identifier (708) is carried out by inserting the classification identifier (708) in the structured document (122) according to a structural insertion scope (804) for the selected presentation attribute (352).

Methods of providing collaborative event media content are further explained with an exemplary use case. Consider the following example of a structured document:

```
<document>

<p id="1">
            a paragraph on an introductory subject
        </p>

<p id="2">
            a map paragraph on a particular subject
        </p>
        <tech level="2">
        <p id="2">
            a more technical paragraph on the same subject
        </p>
        </tech>
        <security level="2">
        <p id="2">
            a more secret paragraph on the same subject
        </p>
        </security>
        <dept id="marketing">
        <p id="2">
            a paragraph on the same subject with added detail
            regarding marketing
        </p>
        </dept>
        <company id="IBM">
        <p id="2">
            a paragraph on the same subject with added detail
            pertinent to a collaborator's company
        </p>
        </company>
        <p id="3">
            a paragraph on a further subject
        </p>
        ... ... ...

... ... ...

... ... ...
</document>
```

This example is generally discussed assuming that this exemplary structured document is associated with a grammar that includes presentation action identifiers for paragraphs. In this example, when context changes for a client identify an event, a set of collaborators are identified and structural elements of the structured document of collaborative even media content are transmitted to the identified collaborators. In this example when a structural element of the first page of the structured document is transmitted to a collaborator and the collaborator speaks the words "next page," a voice response server parses the speech into a presentation control instruction with a presentation action identifier named "PgDn" and communicates the presentation control instruction to display the next page, in this example, page 2 of the structured document.

Assume further that there are five collaborators selected in dependence upon the event created by changed client contexts and note that there are five different versions of paragraph 2 on page two of the structured document. In this example, a first version of paragraph 2 bears a structural identifier <p></p> identifying it as a paragraph, but this first version of paragraph 2 bears no classification identifier. In this example, the unclassified version of paragraph 2 is displayed to all collaborators having either the lowest technical classifications, the lowest security classifications, or no particular technical or security classifications at all. Moreover, in an example, where there were only one version of paragraph 2, all collaborators would be presented with that one version.

In this example, a second version of paragraph 2 is classified with a classification identifier <tech level="2">. In this example, the second version of paragraph 2 is displayed to collaborators having collaborator classification indicating technical level 2. That is, when a collaborator having technical level 2 in the collaborators profile classifications is selected in dependence upon events created by changed client contexts, rather than displaying an unclassified version of paragraph 2, the second version of paragraph 2 classified <tech level="2"> is displayed to such a collaborator.

Similarly, a collaborator having a profile classification representing a heightened security authorization, security level 2, is shown the version of paragraph 2 classified by the classification identifier <security level="2">. A collaborator having a collaborator profile classification identifying the collaborator as a member of the marketing department is shown the version of paragraph 2 classified by the classification identifier <dept id="marketing">. A collaborator having a profile classification identifying the collaborator as an employee of IBM is shown the version of paragraph 2 classified by the classification identifier <company id="IBM">.

For purposes of clarity of explanation, the structural elements in this example are shown with only one classification per element. Persons of skill in the art will recognize, however, that it is well within the scope of the present invention for a structural element of a structured document to be classified with any number of classification identifiers.

Delivering Dynamic Media Content to Collaborators

Figure 11:
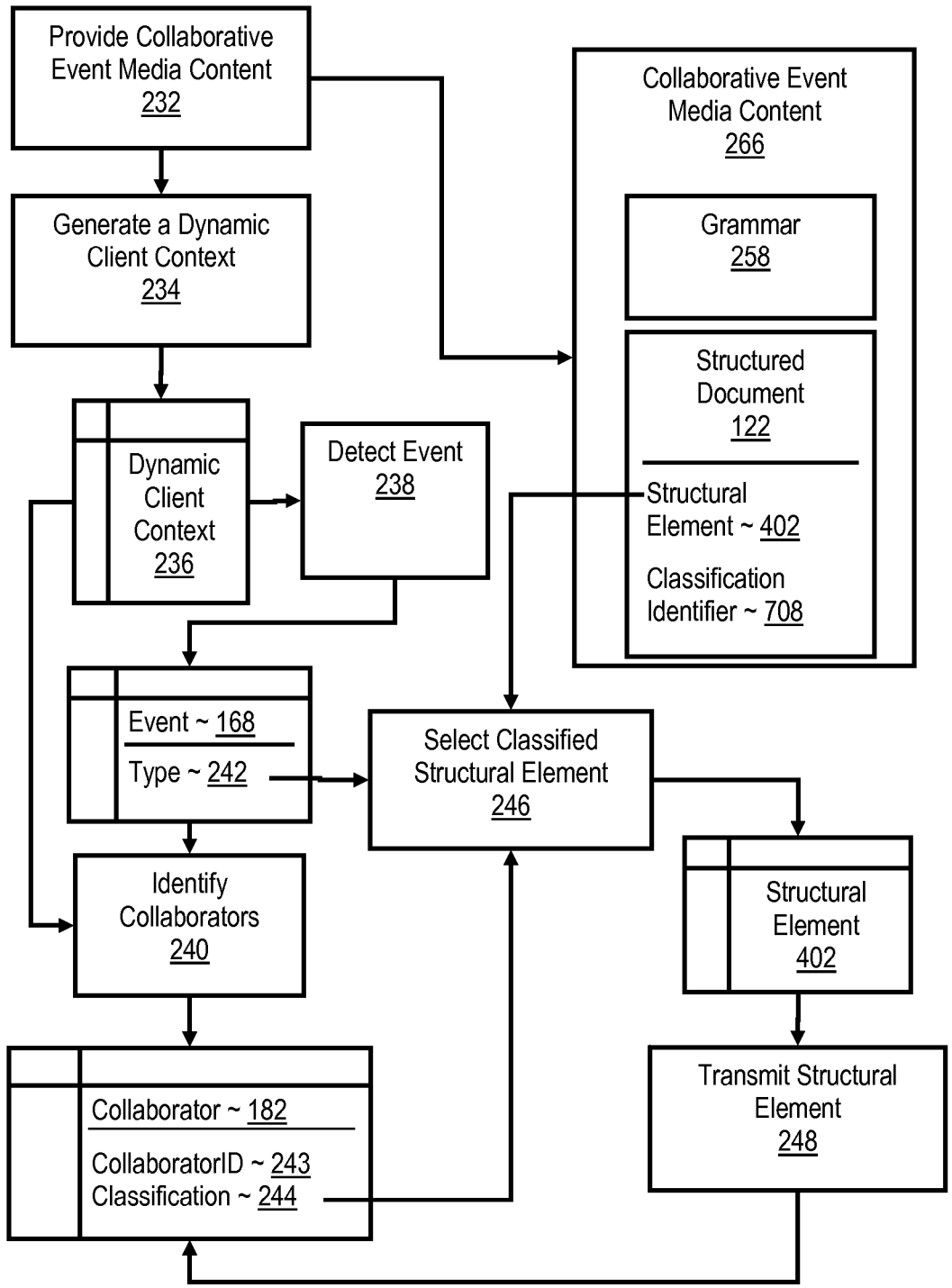
FIG. 11 sets forth a flow chart illustrating an exemplary method for delivering dynamic media content to collaborators.

For further explanation, FIG. 11 sets forth a flow chart illustrating an exemplary method for delivering dynamic media content to collaborators that includes providing (232) collaborative event media content (266). In the method of FIG. 11, the collaborative event media content (266) includes a grammar (258) and a structured document (122). In the method of FIG. 11, providing (232) collaborative event media content (266) is carried out by creating, in dependence upon original media content, a structured document and creating a grammar for the collaborative event media content (266) as discussed in more detail above with reference to FIGS. 3-10.

The method of FIG. 11 includes generating (234) a dynamic client context (236) for a client. In the method of FIG. 11, generating (234) a dynamic client context (236) is carried out by acquiring data that describes the client and the client's environment and storing the data describing the client and the client's environment in a context server.

The method of FIG. 11 includes detecting (238) an event (168) in dependence upon the dynamic client context (206). For further explanation of detecting events, FIG. 12 sets a forth flow chart illustrating an exemplary method for detecting (238) an event (168) in dependence upon a dynamic client context (236). The method of FIG. 12 includes detecting (256) a change in a value of a data element in the dynamic client context (236) and applying (262) rules from event detection rules base (164) to the dynamic client context (164) to determine whether an event has occurred.

Figure 12:
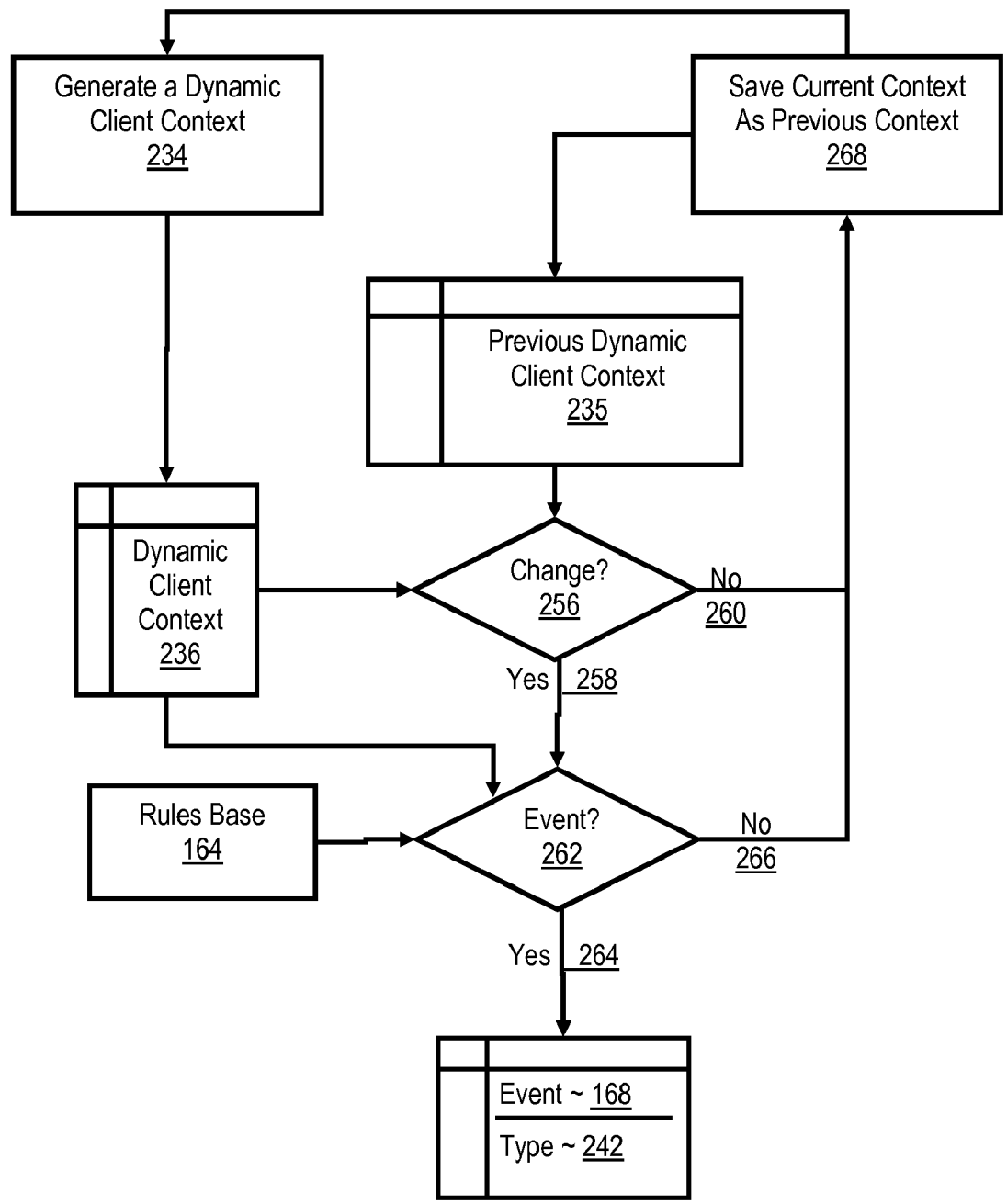
FIG. 12 sets a forth flow chart illustrating an exemplary method for detecting an event in dependence upon a dynamic client context.

In the method of FIG. 12, detecting (256) a change in a value of a data element in the dynamic client context (236) is carried out by comparing data values in a current dynamic client context (236) with corresponding values from a previous dynamic client context (235) for the same client. If there is any change (256), the method of FIG. 12 proceeds by applying (262) rules from a rules base (164) to determine whether the context data as changed represents an event. If there is no change in the context data (260), the method of FIG. 12 proceeds by saving (268) the current dynamic client context as a previous dynamic client context and continuing to generate (234) dynamic client contexts as client data comes in. If an event is recognized according to the rules from the rules base, the method of FIG. 12 creates an event object (168) of an event type (242).

As mentioned above, the method of FIG. 12 may create an event object by passing an event type identified by the rules base to an object oriented parameterized event creation factory method in an event factory object. Such an event factory instantiates and returns an object of a concrete event class named, for example, fireEvent, carWreckEvent, hazMatEvent, gunEvent, burglaryEvent, and so on, as will occur to those of skill in the art, derived from an abstract event class. The abstract class declares member data elements and member methods needed by all concrete event classes in the system. Each concrete event class is augmented with member data elements and member methods as needed to address particular kinds of events, fires, automobile accidents, hazardous materials spills identified by chemical sensors, firearms presence identified by metal detectors, burglaries identified by motion detectors, and so on.

When an event generator instantiates an event object, the event generator typically may include in the event object a reference to one or more dynamic client context objects, including the current dynamic client context object whose changes in data values triggered the event, but also one or more previous dynamic client context objects so that an action engine may have previous data values as needed. Alternatively, a concrete event class may include all the data elements needed for action preparation, so that only the data values are loaded from the pertinent dynamic client contexts rather than including the dynamic client contexts themselves, object built from them, or object oriented references or pointers to them.

Again referring to FIG. 11: The method of FIG. 11 includes identifying (240) one or more collaborators (182) in dependence upon the dynamic client context (236) and the event (168). As mentioned above in connection with the description of the system of FIG. 1, event (168) contains not only its event type (242), but also all the data needed to develop actions in response to the event, including data from or references to objects built from pertinent dynamic client contexts (236). Identifying collaborators typically is carried out by applying collaborator selection rules to the event type (242) to identify from a collaborator profile database a collaborator for the event. Collaborator profiles are data structures, such as those shown for example at reference (182) on FIG. 2, often implemented as records in a collaborator profile database (184) that include data elements describing a collaborator, including, for example, collaborator name, collaborator identification code, collaborator physical location, collaborator type or classification code (EMS, police, wife, accountant, lawyer, HazMat Responder, and so on), and a list (681 on FIG. 2) of one or more event types in which a collaborator may collaborate. Collaborator selection rules are implemented to identify collaborators on the basis of event type, collaborator presence on a instant messaging network, client location, collaborator location, and collaborator type or classification.

The method of FIG. 11 includes selecting (246) from the structured document (122) a classified structural element (402) in dependence upon an event type (242) and a collaborator classification (244). Selecting a classified structural element can be carried out by selecting a classified structural element having an associated classification identifier that corresponds to the collaborator classification. Alternatively, selecting a classified structural element can be carried out by selecting a classified structural element in dependence upon characteristics of a collaborator's display device. In such examples, the selected structural element has an associated classification identifier that corresponds to a display device ID stored in the collaborator's profile. Selecting structural elements in dependence upon the device characteristics of the display device advantageously facilitates selecting structural elements that are most compatible with the collaborator's display device.

The method of FIG. 11 includes transmitting (248) the selected structural element (402) to the collaborator (182). In the method of FIG. 11 transmitting (248) the selected structural element (402) to the collaborator (182) is carried out by: selecting a data communications protocol for communications with a collaborator; inserting the selected structural element in a data structure appropriate to the data communications protocol; and transmitting the data structure to the collaborator according to the data communications protocol.

Figure 13:
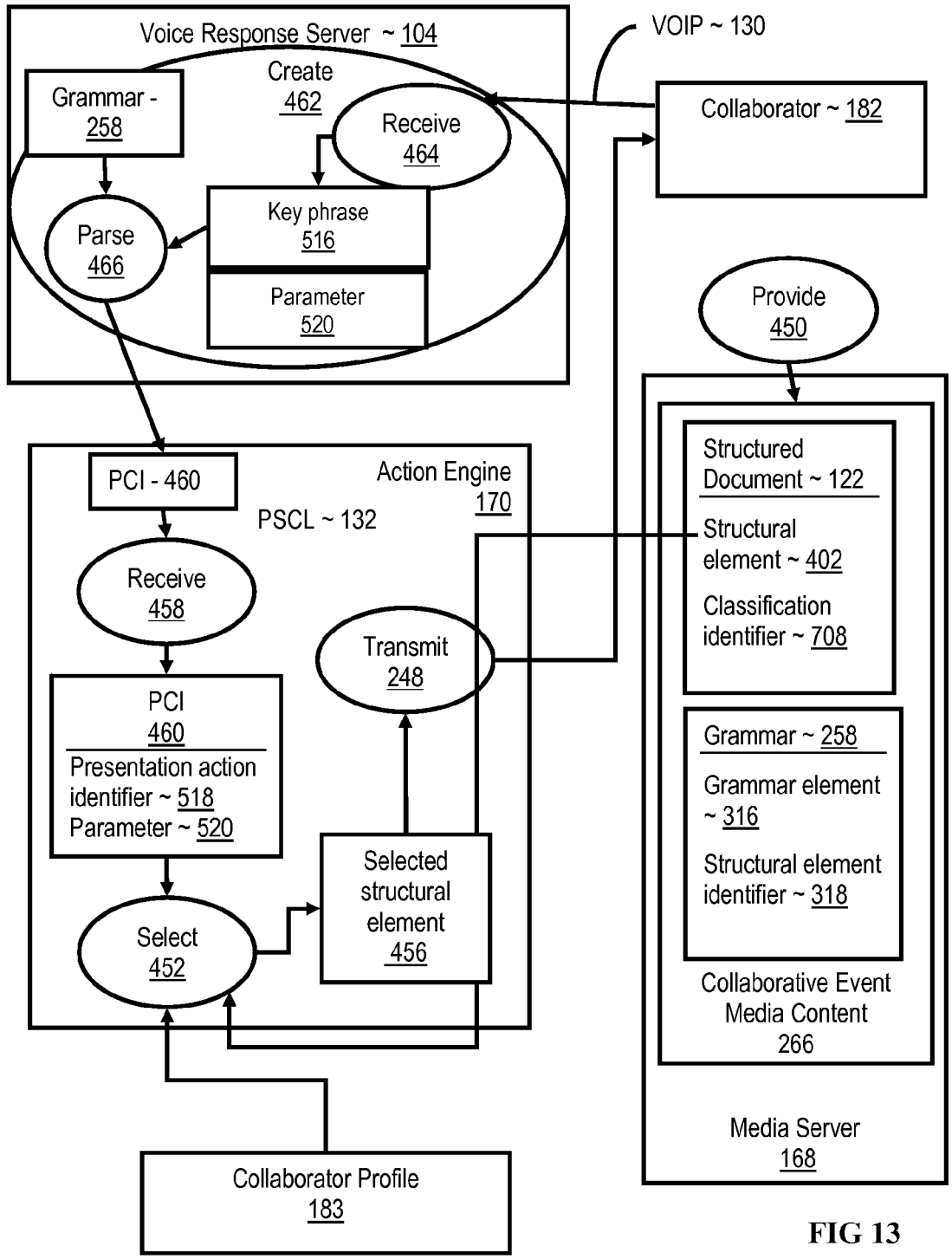
FIG. 13 sets forth a data flow diagram illustrating a further exemplary method for selecting classified structural elements and transmitting them to a collaborator.

For Further explanation FIG. 13 sets forth a data flow diagram illustrating a further exemplary method for selecting classified structural elements and transmitting them to a collaborator. The method of FIG. 13 enables delivery of collaborative event media content to collaborators according to a wide variety of organizational membership, technical knowledge, security authorization, and so on, across almost any dimension in which participants may vary. Such delivery is accomplished generally in methods and systems according to embodiments of the present invention by use of structured, classified collaborative event media content, which typically is made up of a grammar and a structured document. Using such documents as a source of presentation content, collaborative event media content is delivered by selecting from a structured document classified structural elements for delivery to particular collaborators according to the classification identifiers in the document and collaborator classifications or type codes from collaborator profiles.

The method of FIG. 13 includes providing (450) collaborative event media content (266) for use in responding to events generated by changes in dynamic client contexts. In the method of FIG. 13, the collaborative event media content (266) includes a grammar (258) and a structured document (122), and providing (450) collaborative event media content (266) is carried out by as described in detail above with reference to FIGS. 3-10.

The method of FIG. 13 also includes creating (462) a presentation control instruction (460). A presentation control instruction is an instruction to an action engine (170) to carry out a particular presentation action such as, for example, 'display next page,' 'display next slide,' 'display paragraph 5,' 'send a map of client's location,' 'send travel directions to client's location,' and so on as will occur to those of skill in the art. More particularly, in collaborative event media content delivery, presentation actions are carried out by presenting to a particular collaborator a version of a particular structural element, such as a paragraph, a slide, a map, and so on, according to collaborator classifications such as organization name, security authorization, technical expertise level, and so on. In the method of FIG. 13, an exemplary presentation control instruction (460) includes a presentation action identifier (518) and one or more optional parameters (520).

In the method of FIG. 13, creating the presentation control instruction is carried out by receiving (464) from a collaborator (182) a key phrase (516) and optional parameters (520) for invoking a presentation action and parsing (466) the key phrase (516) and parameters (520) against a grammar (258) into a presentation control instruction (460). The grammar (258) used in the voice response server (104) may be developed specially for voice response service or may be the same grammar (258) used in the collaborative event media content with the structured document (122).

In this example, receiving (464) a key phrase (516) is carried out by use of a Voice Over Internet Protocol ("VOIP") link (130) that carries the speech of at least one collaborator (182) from the collaborator's communications device to a voice response server (104). A VOIP link is a kind of computer hardware and software that uses an internet protocol network instead of a traditional telephone network as the transmission medium for speech. VOIP is sometimes referred to as 'IP telephony' or 'Voice Over the Internet' ("VOI"). Examples of user client devices include any computer equipment capable of converting input speech to digital data and transmitting it over the internet protocol to a voice response server, including handheld wireless devices, personal digital assistants, personal computers, laptop computers, and the like.

The method of FIG. 13 also includes receiving (458) a presentation control instruction (460) in an action engine (170) and selecting (452) from a structured document (122) a classified structural element (402) in dependence upon collaborator classifications (210) of a collaborator (182). In the method of FIG. 13, selecting (452) a classified structural element (402) is carried out by selecting a classified structural element (402) in dependence upon the presentation action identifier (518) and the parameters (520) from the presentation control instruction (460). In the method of FIG. 13, selecting (452) a classified structural element (402) also includes selecting a classified structural element having an associated classification identifier (708) that corresponds to the collaborator classification (210).

For further explanation, consider an example using the following exemplary structured document:

```
<collaborativeEventMediaContent>
    <Grammar>
        <grammarElement>
            <contentType id="WP">
            <keyPhrase>page down</keyPhrase>
            <presentationAction id="PgDn">
            <structuralElementIdentifier id="page">
        </grammarElement >
    </Grammar>
    <structuredDocument>

<p id="1"> a paragraph </p>
            <p id="2"> another paragraph </p>

<p id="2">a paragraph on a particular subject</p>
            <tech level="2">
```

-continued

```
        <p id="2">a more technical paragraph, same
            subject</p>
        </tech>
        <company id="IBM">
        <p id="2">a paragraph, same subject with added detail
            pertinent to a user's company</p>
        </company>
        <p id="3">a paragraph on some other subject</p>
        ... ... ...

</structuredDocument>
</collaborativeEventMediaContent >
```

In this example, assume that a first collaborator has in a collaborator profile collaborator classifications indicating that the collaborator is an IBM employee and a second collaborator has collaborator classifications indicating that the collaborator has technical ability level '2'. In this example, an action engine receives (458) a presentation control instruction (460) to move to the display to the second page of the structured document. The action engine then selects (452) from the structured document (256) for the first collaborator the structural element identified as a version of page two and classified as:

```
<company id="IBM">
<p id="2">a paragraph, same subject with added detail pertinent to a
    collaborator's company</p>
</company>
``` and for the second collaborator the structural element identified as a version of page two and classified as:

```
    <tech level="2">
    <p id="2">a more technical paragraph, same subject</p>
    </tech>
```

The method of FIG. 13 also includes transmitting (248) the selected structural element (456) to the collaborator (182). In the method of FIG. 13, transmitting (248) the selected structural element (456) to the collaborator may be carried out, for example, by selecting a data communications protocol for the presentation, inserting the selected structural element (without its classification identifiers) in a data structure appropriate to the data communications protocol, and transmitting the data structure to the collaborator according to the data communications protocol. If, for example, the data communications protocol is selected as HTTP, a data structure appropriate to the data communications protocol is an HTML document in an HTTP RESPONSE message. In such an example, transmitting (248) the selected structural element (456) to the collaborator may be carried out, for the two exemplary versions of page two selected above, by the following HTTP RESPONSE messages:

```
HTTP/1.1 200 OK
Date:
Content-Type: text/xml
Content-Length: 128
<html><body><p id="2">a paragraph, same subject with added detail
pertinent to a collaborator's company</p> </body></html>
``` and for the second collaborator the structural element identified as a version of page two and classified as:

```
HTTP/1.1 200 OK
Date:
Content-Type: text/xml
Content-Length: 103
<html><body><p id="2">a more technical paragraph, same
subject</p></body></html>
``` respectively, the first sent to the communications device of the first collaborator and the second sent to the communications device of the second collaborator. Note that in both transmissions, the classification identifiers are omitted, <company id="IBM"> and <tech level="2"> respectively.

This example of transmitting (248) a selected structural element (456) to a collaborator (182) is expressed in terms of HTML and HTTP, a stateless, asynchronous protocol. Many embodiments will statefully hold open a data communications connection, such as a TCP/IP connection, between a presentation server and a collaborator communication device. A Stateful Java Enterprise Session Bean™ may be used, for example, to hold open a TCP/IP connection implemented with a Java socket object. Readers of skill in the art will recognize therefore that HTML and HTTP are used for explanation, not for limitation. In fact, any presentation application using any appropriate data communications protocol useful for multi-media presentations may be used to present structural elements to collaborators according to embodiments of the present invention. Such application may be obtained off-the-shelf commercially or they may be specially developed for particular presentations or kinds of presentation. An example of such an application available commercially is Microsoft NetMeeting™. Examples of other data communications protocols useful with various embodiments of the present invention include the Session Initiation Protocol specified in the IETF's RFC 2543, the Real Time Streaming Protocol as specified in the IETF's RFC 2326, the Real Time Transport Protocol of RFC 1889, and the World Wide Web Consortium's VoiceXML protocol specified in the 2003 document entitled "Voice Extensible Markup Language (VoiceXML) Version 2.0".

Figure 14:
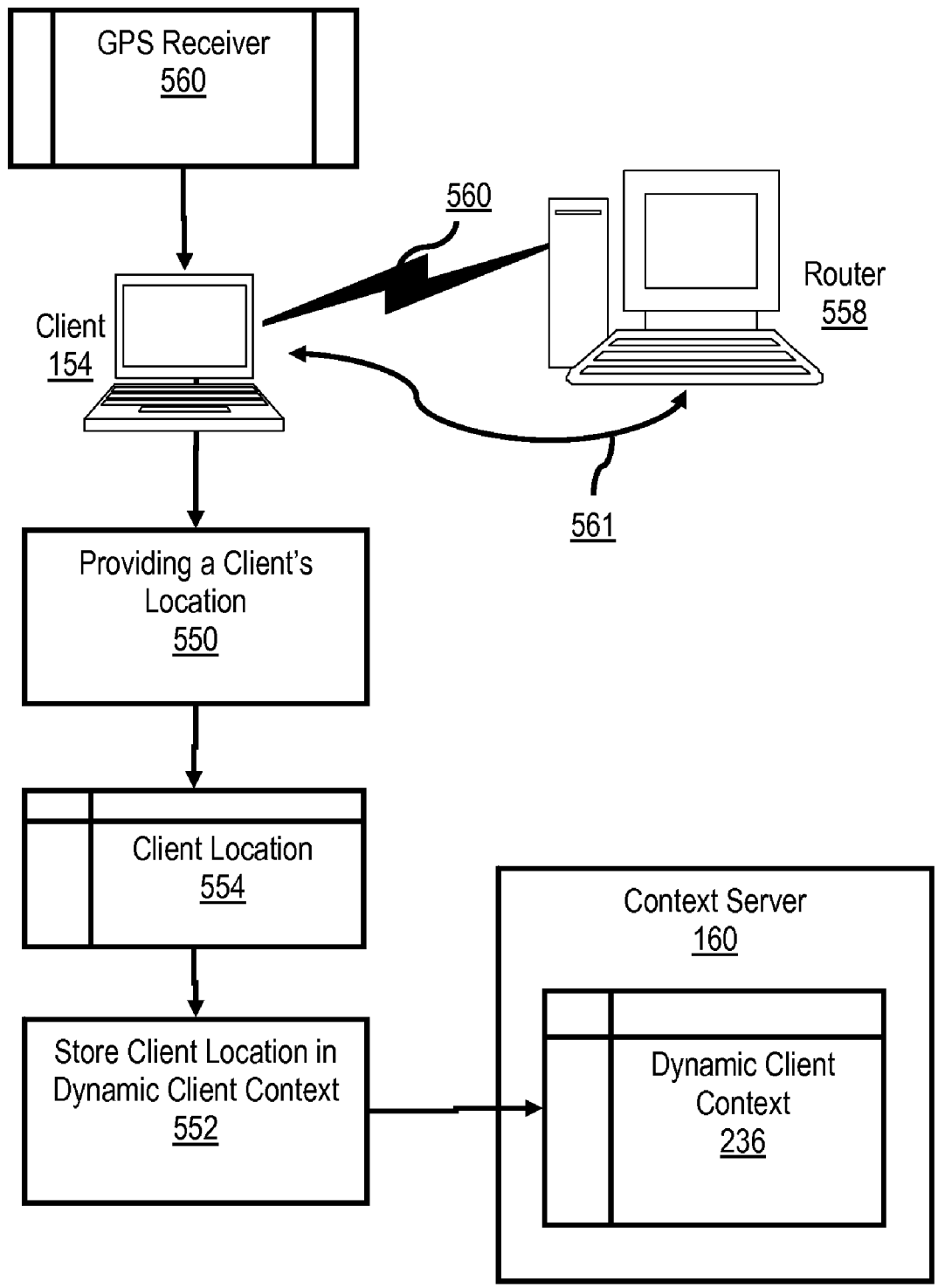
FIG. 14 sets forth a flow chart illustrating an exemplary method for generating a dynamic client context for a client.

For further explanation, FIG. 14 sets forth a flow chart illustrating an exemplary method for generating a dynamic client context (236) for a client that includes providing (550) data (554) identifying a client's location and storing (552), in the context server (160) in a data structure comprising a dynamic client context (236) for the client (154), the data (554) identifying the client's location. In the method of FIG. 14, providing (550) to a context server (160) data identifying a client's location may be carried out by GPS coordinates from a GPS receiver (560) and storing (552) the data identifying the client's location may be carried out by storing the GPS coordinates in the dynamic client context (236) for the client (154).

In the method of FIG. 14, providing (220) to a context server (160) data identifying a client's location may also be carried out by querying (558) a router for a physical address of the router; and storing (552) the data identifying the client's location may be carried out by storing the physical address of the router (558) in the dynamic client context (236) for the client (154). Router (558) may, for example, provide a wireless access point (560) to an internet, a so-called Wi-Fi connection or 'hotspot,' through which portable computers effect wireless connection to the World Wide Web, for example. For such connections, the client may not be configured with its physical address and so therefore advantageously may query the router through the OSI link layer, through an ARP (Address Resolution Protocol) query, for example, for the physical address of the router. This method is useful for 802.11b-type wireless connections, for example, because in order to effect such connections, the client must be located physically close enough to the router so that the router's physical address is a good approximation for the physical address of the client.

In the method of FIG. 14, providing (550) to a context server (160) data identifying a client's location may be carried out by querying a router (558) for a physical address of the client (154) and storing (552) the data identifying the client's location may be carried out by storing (552) the physical address of the client (154) in the dynamic client context (236) for the client (154). Router (558) may, for example, provide a wired (561) network connection for a client (154), in which case the physical location of the router, even if it is known, may provide inadequate precision in locating clients connected to it. Such clients could be anywhere in a large building, anywhere in a large campus of buildings, almost anywhere with relation to the router.

Internet protocol routers typically maintain ARP caches for use in resolving network addresses to link layer addresses. For efficient link layer address resolution, a router typically stores recently resolved network addresses in association with their corresponding link layer addresses in an ARP cache. To resolve link layer addresses into physical addresses, an ARP cache may be modified according to embodiments of the present invention to include also physical addresses of clients connected to a network through a router.

An example of an ARP cache modified according to embodiments of the present invention is shown in Table 2. Routers may serve more than only port on more than one LAN, but for ease of explanation, Table 2 illustrates an ARP cache for a single LAN on a single port on a single router. Table 2 associates network layer addresses and link layer addresses in two entry types, dynamic and static. Static ARP cache entries remain in the cache. Dynamic entries store 'learned addresses' entered automatically by the router in response to ARP queries or DHCP (Dynamic Host Configuration Protocol) offer messages, for example, and dynamic entries are 'aged' for an 'aging time.' That is, dynamic ARP cache entries time out according to the cache's aging time and are then deleted from the ARP cache. Because dynamic ARP cache entries time out, ARP cache entries for resolving link layer addresses into physical locations advantageously are typically created as static ARP cache entries.

TABLE 2

Exemplary ARP Cache

| Network Layer Address | Link Layer Address | Physical Address | Type |
|---|---|---|---|
| 199.199.40.1 | 00 00 0c 1a eb c5 | 504 Lavaca | Static |
|  | 00 dd 01 07 57 15 | Bldg 1, Rm 5 | Static |
| 10.57.10.32 | 00 60 8c 0e 6c 6a | 302 Congress | Static |
| 199.199.40.124 | 00 11 2c 1c ef c4 |  | Dynamic |

Table 2 includes three static ARP cache entries that resolve client's link layer addresses to physical addresses. Note that the second such entry remains in the cache even though the DHCP of its network address has expired. It remains in the cache because the link layer address is unique to a device connected to the routers, and the method of FIG. 14 therefore will resolve that client's physical address given its link layer address regardless whether that client has a current network address. A client may query a router for the client's physical address by use of new or modified request/response messages in the Internet Control Message Protocol ('ICMP'), the Internet Protocol ('IP'), the link layer itself as in a new or modified Ethernet message type, and in other ways as will occur to those of skill in the art.

Figure 15:
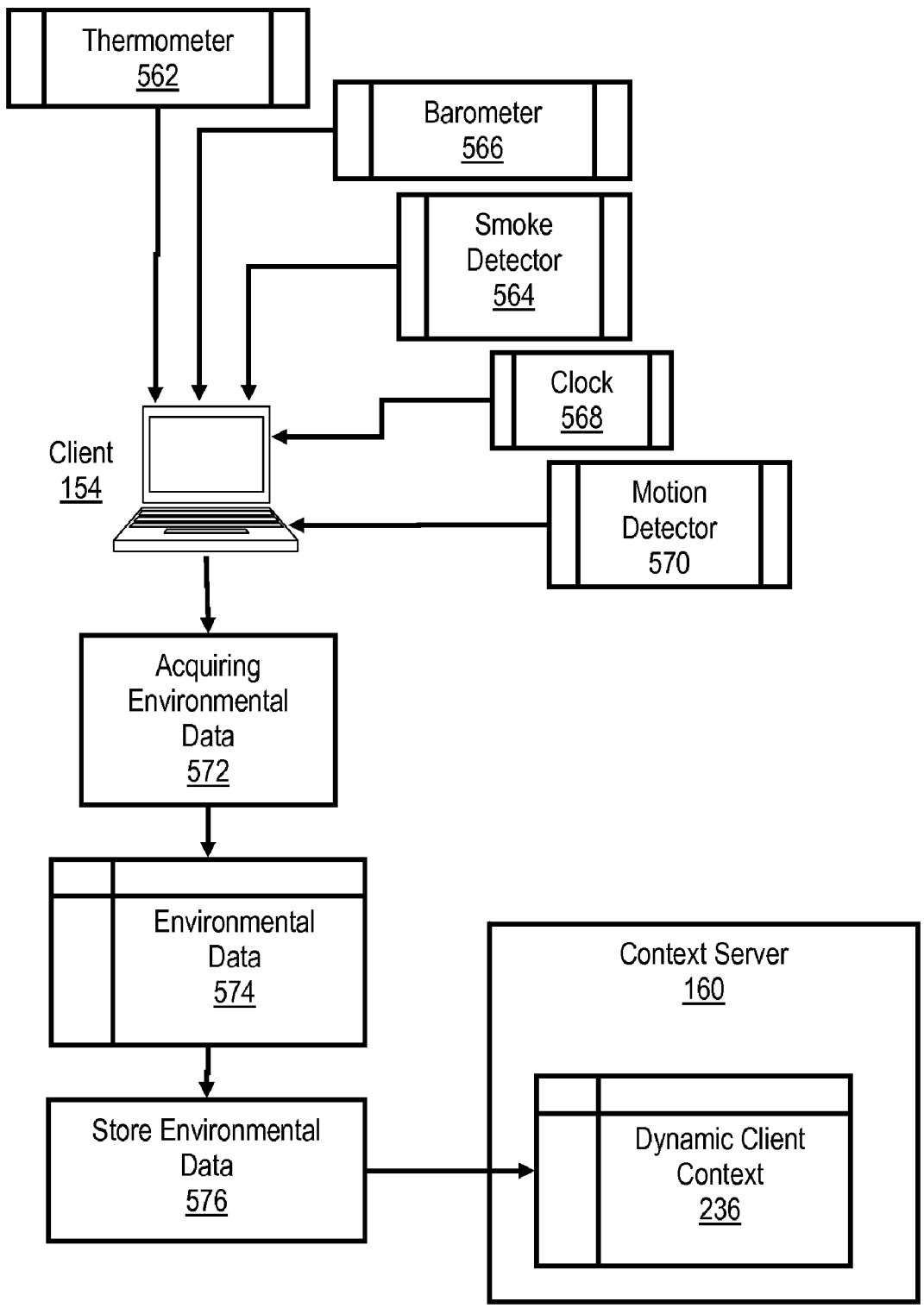
FIG. 15 sets forth a flow chart illustrating an exemplary method for generating a dynamic client context for a client.

For further explanation, FIG. 15 sets forth a flow chart illustrating another exemplary method for generating a dynamic client context (236) for a client that includes acquiring (572) data (547) representing a client's environmental condition and storing (576), in the context server (160) in a data structure comprising a dynamic client context (236) for the client (154), the data (574) representing a client's environmental condition. In the method of FIG. 15, acquiring data representing a client's environmental condition may be carried out by receiving asynchronously from environmental sensors data representing a client's environmental condition. In the method of FIG. 15, the dynamic client context may include network addresses for environmental sensors for a client and acquiring data representing a client's environmental condition may be carried out by the context server's polling of the environmental sensors for the client.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for delivering dynamic media content to collaborators, the method comprising:
  providing collaborative event media content, wherein the collaborative event media content further comprises a grammar and a structured document, said structured document comprising a plurality of classified structural elements;
  acquiring data representing a client's environmental condition;
  storing, in the context server in a data structure comprising a dynamic client context for the client, the data representing a client's environmental condition;
  detecting an event in dependence upon the dynamic client context;
  identifying one or more collaborators in dependence upon the dynamic client context and the event;
  selecting from the structured document a classified structural element from among the plurality of classified structural elements based upon an event type and a collaborator classification associated with a collaborator among the one or more collaborators; and
  transmitting the selected classified structural element to the collaborator.

2. The method of claim 1 wherein acquiring data representing a client's environmental condition further comprises receiving asynchronously from environmental sensors data representing a client's environmental condition.

3. The method of claim 1 wherein the dynamic client context includes network addresses for environmental sensors for a client and acquiring data representing a client's environmental condition further comprises the context server's polling of the environmental sensors for the client.

4. The method of claim 1 wherein detecting an event in dependence upon the dynamic client context further comprises:

detecting a change in a value of a data element in the dynamic client context; and applying an event detection rules base to the dynamic client context.

5. The method of claim 1 wherein providing collaborative event media content further comprises:

creating, in dependence upon original media content, a structured document, the structured document further comprising one or more structural elements;

creating the grammar for the collaborative event media content, wherein the grammar includes grammar elements each of which includes an identifier for at least one structural element of the structured document;

wherein the grammar is a data structure associating key phrases with presentation actions that facilitates the collaborator navigating the structured document of collaborative event media content using speech commands.

6. The method of claim 5 further comprising classifying a structural element of the structured document according to a presentation attribute.

7. The method of claim 6 wherein classifying a structural element comprises:

identifying a presentation attribute for the structural element;

identifying a classification identifier in dependence upon the presentation attribute; and inserting the classification identifier in association with the structural element in the structured document.

8. The method of claim 1 wherein identifying the one or more collaborators further comprises identifying the collaborator in dependence upon collaborator presence on a instant messaging network.

9. The method of claim 1 wherein identifying the one or more collaborators in dependence upon the identified event comprises identifying collaborator in dependence upon client location.

10. The method of claim 1 wherein transmitting the selected structural element to the collaborator further comprises:

selecting a data communications protocol for communications with the collaborator;

inserting the selected structural element in a data structure appropriate to the data communications protocol; and transmitting the data structure to the collaborator according to the data communications protocol.

11. The method of claim 1, wherein the collaborator is a first collaborator, the collaborator classification is a first collaborator classification, and the classified structural element is a first classified structural element, the method further comprising:

selecting from the structured document a second classified structural element from among the plurality of classified structural elements based upon an event type and a second collaborator classification; and transmitting the selected second classified structural element to a second collaborator.

12. A computer program product for delivering dynamic media content to collaborators, the computer program product comprising:

a non-transmission recording medium having computer readable program code embodied therewith, the computer readable program code comprising:

computer readable program code configured to:

provide collaborative event media content, wherein the collaborative event media content further comprises a grammar and a structured document, said structured document comprising a plurality of classified structural elements;

acquire data representing a client's environmental condition;

store, in the context server in a data structure comprising a dynamic client context for the client, the data representing a client's environmental condition;

detect an event in dependence upon the dynamic client context;

identify one or more collaborators in dependence upon the dynamic client context and the event;

select from the structured document a classified structural element from among the plurality of classified structural elements based upon an event type and a collaborator classification associated with a collaborator among the one or more collaborators; and transmit the selected structural element to the collaborator.

13. The computer program product of claim 12 wherein the computer readable program code configured to acquire data representing a client's environmental condition further comprises computer readable program code configured to receive asynchronously from environmental sensors data representing a client's environmental condition.

14. The computer program product of claim 12 wherein the dynamic client context includes network addresses for environmental sensors for a client and wherein the computer readable program code configured to acquire data representing a client's environmental condition further comprises for computer readable program code configured to poll the environmental sensors for the client.

15. The computer program product of claim 12 wherein the computer readable program code configured to detect an event in dependence upon the dynamic client context further comprises:

computer readable program code configured to detect a change in a value of a data element in the dynamic client context; and computer readable program code configured to apply an event detection rules base to the dynamic client context.

16. The computer program product of claim 12, wherein the computer readable program code configured to provide collaborative event media content further comprises:

computer readable program code configured to create in dependence upon original media content, a structured document, the structured document further comprising one or more structural elements;

computer readable program code configured to create the grammar for the collaborative event media content, wherein the grammar includes grammar elements each of which includes an identifier for at least one structural element of the structured document;

wherein the grammar is a data structure associating key phrases with presentation actions that facilitates the collaborator navigating the structured document of collaborative event media content using speech commands.

17. The computer program product of claim 16 further comprising computer readable program code configured to classify a structural element of the structured document according to a presentation attribute.

18. The computer program product of claim 17 wherein the computer readable program code configured to classify a structural element comprises:

computer readable program code configured to identify a presentation attribute for the structural element;

computer readable program code configured to identify a classification identifier in dependence upon the presentation attribute; and computer readable program code configured to insert the classification identifier in association with the structural element in the structured document.

19. The computer program product of claim 12 wherein the computer readable program code configured to identify the one or more collaborators further comprises computer readable program code configured to identify the collaborator in dependence upon collaborator presence on a instant messaging network.

20. The computer program product of claim 12 wherein the computer readable program code configured to identify the one or more collaborators in dependence upon the identified event comprises computer readable program code configured to identify the collaborator in dependence upon client location.

21. The computer program product of claim 12 wherein the computer readable program code configured to transmit the selected structural element to the collaborator further comprises:

computer readable program code configured to select a data communications protocol for communications with the collaborator;

computer readable program code configured to insert the selected structural element in a data structure appropriate to the data communications protocol; and computer readable program code configured to transmit the data structure to the collaborator according to the data communications protocol.

22. The computer program product of claim 12, wherein the collaborator is a first collaborator, the collaborator classification is a first collaborator classification, and the classified structural element is a first classified structural element, the method further comprising:

computer readable program code configured to select from the structured document a second classified structural element from among the plurality of classified structural elements based upon an event type and a second collaborator classification; and computer readable program code configured to transmit the selected second classified structural element to a second collaborator.

23. An apparatus for delivering dynamic media content to collaborators, the apparatus comprising:

a dynamic media server coupled for data communications with a client coupled for data communication with a context server coupled for data communications with an action engine;

wherein the dynamic media server comprises a module of automated computing machinery that provides collaborative event media content, wherein the collaborative event media content further comprises a grammar and a structured document, said structured document comprising a plurality of classified structural elements;

the client comprises a module of automated computing machinery that acquires from an environmental sensor data representing the client's environmental condition and stores the data representing the client's environmental condition in the context server in a data structure comprising a dynamic client context for the client;

the context server comprises a module of automated computing machinery that detects an event in dependence upon the dynamic client context; and the action engine comprises a module of automated computing machinery that identifies one or more collaborators in dependence upon the dynamic client context and the event, selects from the structured document a classified structural element from among the plurality of classified structural elements based upon an event type and a collaborator classification associated with a collaborator among the one or more collaborators and transmits the selected structural element to the collaborator.

24. The apparatus of claim 23 wherein the dynamic client context includes network addresses for environmental sensors for the client and wherein the client polls the environmental sensors to acquire data representing the client's environmental condition.

25. The apparatus of claim 23 wherein the context server detects an event in dependence upon the dynamic client context by detecting a change in a value of a data element in the dynamic client context and applying an event detection rules base to the dynamic client context.

26. The apparatus of claim 23 wherein the dynamic media server provides collaborative event media content by creating, in dependence upon original media content, a structured document, the structured document further comprising one or more structural elements; and creating the grammar for the collaborative event media content, wherein the grammar includes grammar elements each of which includes an identifier for at least one structural element of the structured document;

wherein the grammar is a data structure associating key phrases with presentation actions that facilitates the collaborator navigating the structured document of collaborative event media content using speech commands.

27. The apparatus of claim 26 wherein the dynamic media server classifies a structural element of the structured document according to a presentation attribute.

28. The apparatus of claim 27 wherein the dynamic media server classifies a structural element of the structured document according to a presentation attribute by identifying a presentation attribute for the structural element, identifying a classification identifier in dependence upon the presentation attribute, and inserting the classification identifier in association with the structural element in the structured document.

29. The apparatus of claim 23 wherein the action engine identifies the one or more collaborators in dependence upon the dynamic client context and the event in dependence upon collaborator presence on an instant messaging network.

30. The apparatus of claim 23 wherein the action engine identifies the one or more collaborators in dependence upon the dynamic client context and the event in dependence upon client location.

31. The apparatus of claim 23 wherein the action engine transmits the selected structural element to the collaborator by selecting a data communications protocol for communications with the collaborator, inserting the selected structural element in a data structure appropriate to the data communications protocol, and transmitting the data structure to the collaborator according to the data communications protocol.

32. The apparatus of claim 23, wherein the collaborator is a first collaborator, the collaborator classification is a first collaborator classification, and the classified structural element is a first classified structural element, the action engine being further configured to select from the structured document a second classified structural element from among the plurality of classified structural elements based upon an event type and a second collaborator classification, and transmit the selected second classified structural element to a second collaborator.

* * * * *